US012696913B2

(12) United States Patent
Lamb

(10) Patent No.: US 12,696,913 B2
(45) Date of Patent: Aug. 4, 2026

(54) FEED COMPOSITIONS

(71) Applicant: Ralco Nutrition, Inc., Marshall, MN (US)

(72) Inventor: Richard Dale Lamb, Balaton, MN (US)

(73) Assignee: Ralco Nutrition, Inc., Marshall, MN (US)

(*) Notice: Subject to any disclaimer, the term of this patent is extended or adjusted under 35 U.S.C. 154(b) by 441 days.

(21) Appl. No.: 16/931,301

(22) Filed: Jul. 16, 2020

(65) Prior Publication Data

US 2021/0015120 A1 Jan. 21, 2021

Related U.S. Application Data

(60) Provisional application No. 62/874,609, filed on Jul. 16, 2019.

(51) Int. Cl.

| | |
|---|---|
| ***A23K 20/20*** | (2016.01) |
| ***A23K 10/18*** | (2016.01) |
| ***A23K 10/30*** | (2016.01) |
| ***A23K 20/105*** | (2016.01) |
| ***A23K 20/137*** | (2016.01) |

(Continued)

(52) U.S. Cl.

CPC .............. *A23K 20/20* (2016.05); *A23K 10/18* (2016.05); *A23K 10/30* (2016.05); *A23K 20/105* (2016.05); *A23K 20/137* (2016.05); *A23K 20/163* (2016.05); *A23K 50/10* (2016.05)

(58) Field of Classification Search

CPC ...... A23K 10/18; A23K 10/30; A23K 20/105; A23K 20/137; A23K 20/163; A23K 20/20; A23K 50/10; A23K 50/20; A23K 50/30; A23K 50/75; A23K 50/80; A23K 20/10;

(Continued)

(56) References Cited

U.S. PATENT DOCUMENTS 9,241,502 B2 1/2016 Block et al.
10,143,218 B1 12/2018 Downs et al.

(Continued)

FOREIGN PATENT DOCUMENTS

CA 3133602 A1 * 11/2016 ............ A23K 10/30
WO 200221930 A1 3/2002

OTHER PUBLICATIONS

Kuester, Olivia Jayne, "An Evaluation of Feeding a Blend of Essential Oils and Cobalt Lactate to Lactating Dairy Cows" (2016). South Dakota State University. Electronic Theses and Dissertations. 1051. https://openprairie.sdstate.edu/etd/1051 (Year: 2016).*

(Continued)

*Primary Examiner* — Michele L Jacobson
*Assistant Examiner* — Carrie Glimm
(74) *Attorney, Agent, or Firm* — Merchant & Gould, P.C.

(57) ABSTRACT

Embodiments of the present disclosure describe feed compositions that can be administered to improve health and immunity in subjects. The feed compositions can comprise one or more mineral compounds, one or more essential oils, one or more emulsifiers, one or more fibers, one or more yeast extracts and/or one or more additional components. The feed compositions can be provided in solid or liquid forms, among others, and administered to subjects, such as animals, to improve their health, immunity, or both.

20 Claims, 3 Drawing Sheets

(51) Int. Cl.
*A23K 20/163* (2016.01)
*A23K 50/10* (2016.01)

(58) Field of Classification Search
CPC ...... A23K 20/111; A23K 20/22; A23K 20/24; A23K 20/30; A23K 10/16
See application file for complete search history.

(56) References Cited

U.S. PATENT DOCUMENTS

| | | | | |
|---|---|---|---|---|
| 10,835,561 | B2 | 11/2020 | Rehberger et al. | |
| 2006/0188549 | A1 | 8/2006 | Block et al. | |
| 2008/0020095 | A1 | 1/2008 | Block et al. | |
| 2010/0178300 | A1 | 7/2010 | Yiannikouris et al. | |
| 2011/0152363 | A1* | 6/2011 | Knochenmus | C07F 15/065 556/110 |
| 2012/0135112 | A1 | 5/2012 | Hiolle et al. | |
| 2015/0297632 | A1* | 10/2015 | Auclair | A61K 45/06 424/195.16 |
| 2016/0206654 | A1* | 7/2016 | Sandberg | A61K 31/165 |
| 2018/0070612 | A1* | 3/2018 | Wan | A23K 20/158 |
| 2018/0125913 | A1 | 5/2018 | Lamb | |
| 2019/0124949 | A1* | 5/2019 | Ghalamkari | A23K 20/174 |
| 2019/0209637 | A1 | 7/2019 | Lamb | |

OTHER PUBLICATIONS

Pretz, Jon Patrick. “Improving Feed Efficiency through Forage Strategies for Increasing Dairy Profitability and Sustainability.” ProQuest Dissertations Publishing, 2016. (Year: 2016).*

Baldan V, Sut S, Faggian M, Dalla Gassa E, Ferrari S, De Nadai G, Francescato S, Baratto G, Dall’Acqua S. Larix decidua Bark as a Source of Phytoconstituents: An LC-MS Study. Molecules. 2017;22(11):1974. https://doi.org/10.3390/molecules22111974 (Year: 2017).*

Elisabeth Stahl-Biskup & Francisco Saez (Eds.). (2002). Thyme: The Genus *Thymus* (1st ed.). CRC Press. https://doi.org/10.4324/9780203216859 (Year: 2002).*

Overton, Ways to Manage Trace Minerals in Dairy Rations, 2014, https://www.agproud.com/articles/22633-ways-to-manage-trace-minerals-in-dairy-rations (Year: 2014).*

Corbion (Animal Health Ingredients, 2017, https://www.corbion.com/-/media/Corbion/Images/Purac-PDF-1-of-5/brch-ah-general-0419-eng-ia_576500.pdf). (Year: 2017).*

PCT/US2020/042404, “International Search Report and Written Opinion”, Dec. 3, 2020.

EMPROVE MX—Emmert, retrieved from https://www.emmert.com/emmert-livestock/emprove-mx-brewers-yeast-ingredients/, on Mar. 16, 2021.

Ghazanfar, S., Khalid, N., & Imran, I. A. a. (2017). Probiotic Yeast: Mode of Action and Its Effects on Ruminant Nutrition. In A. Morata, and I. Loira {Eds.), Yeast—Industrial Applications. IntechOpen. https://doi.org/10.5772/intechopen.70778.

Marston, “The many benefits of adding yeast cultures to creep feeds”, Retrieved from https://www.hubbardfeeds.com/blog/many-benefits-adding-yeast-cultures-creep-feeds on Mar. 16, 2021.

Robinson, “Yeast Products for Growing and Lactating Ruminants: A Literature Summary of Impacts on Rumen Rermentation and Performance”, Cooperative Extension University of California, Davis, 2022.

Translation of 2002/21930 A1 PCT reference, Mar. 21, 2002.

* cited by examiner

FEED COMPOSITIONS

CROSS REFERENCE TO RELATED APPLICATIONS

This application claims priority to provisional U.S. application Ser. No. 62/874,609, filed Jul. 16, 2019, the disclosures of which are incorporated by reference in their entirety.

BACKGROUND

Efficient rearing of animals, such as livestock and fish, is dependent upon ensuring high growth rates, feed intake, productivity, and reproductive success. Some of the greatest threats to animal growth and productivity include bacterial and fungal infections, and oxidative stress. Hormones and antibiotics are commonly used as productivity and growth promoters in animals. For example, antibiotics, such as coccidiostats, are often administered regularly in subtherapeutic doses to promote animal health and growth. However, these approaches have garnered significant outcry from scientific and social communities over the past decade.

Subtherapeutic antibiotics have been linked to pathogenic antibiotic resistance in animals, and their use as animal feed additives and growth promoters are banned in many countries. Similarly, animal hormonal supplements have been linked to detrimental side effects in animals as well as public health concerns for humans. Further, the need for alternatives to subtherapeutic antibiotics and hormonal growth promoters is readily recognized by the significant economic incentive to market animal products as "natural", "organic", "hormone-free" and "antibiotic-free".

Accordingly, it would be desirable to provide a feed composition that improves the health and immunity of animals.

SUMMARY OF THE INVENTION

In general, embodiments of the present disclosure describe feed compositions, methods of administering feed compositions, methods of preparing components of the feed compositions, methods of preparing the feed compositions, and the like.

Embodiments of the present disclosure include a feed composition comprising: one or more of the following components: (a) one or more mineral compounds; (b) one or more essential oils; (c) one or more emulsifiers; (d) one or more fibers; and (e) one or more yeast extracts.

In some embodiments, a feed composition comprising one or more mineral compounds, wherein the mineral compounds include at least cobalt lactate; an essential oil composition comprising at least one of cinnamon essential oil, thyme essential oil, and oregano essential oil; and one or more emulsifiers, wherein the one or more essential oils are present as an emulsion and an average particle size of the one or more essential oils in the emulsion is about 25 microns or less.

Embodiments of the present disclosure include a method of administering a feed composition, comprising: administering a feed composition to a subject, wherein the feed composition comprises: one or more of the following components: (a) one or more mineral compounds; (b) one or more essential oils; (c) one or more emulsifiers; (d) one or more fibers; and (e) one or more yeast extracts.

In some embodiments, a method of administering a feed composition comprising administering a feed composition to a subject, wherein the feed composition comprises: one or more mineral compounds, wherein the mineral compounds include at least cobalt lactate; an essential oil composition comprising at least one of cinnamon essential oil, thyme essential oil, and oregano essential oil; and one or more emulsifiers, wherein the one or more essential oils are present as an emulsion and an average particle size of the one or more essential oils in the emulsion is about 25 microns or less.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Definitions

Figure 1:
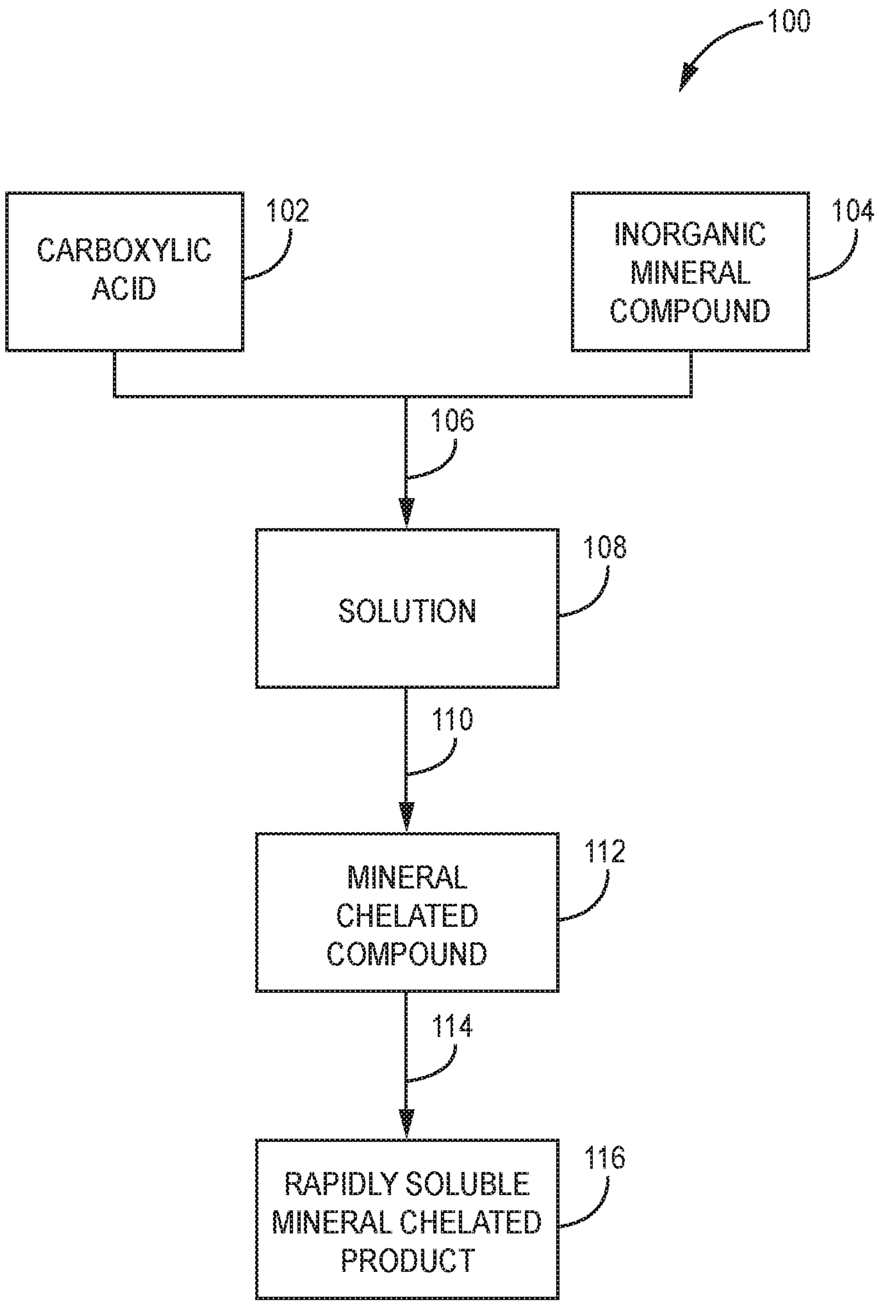
FIG. 1 is a flowchart of a method of making a rapidly soluble mineral chelated product, according to one or more embodiments of the present disclosure.

The terms recited below have been defined as described below. All other terms and phrases in this disclosure shall be construed according to their ordinary meaning as understood by one of skill in the art.

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* $14^{th}$ Edition, by R. J. Lewis, John Wiley & Sons, New York, N.Y., 2001.

The term "chelation" refers to the formation of two or more separate coordinate bonds between a polydentate (multiple bonded) ligand and a single central atom, typically a metal ion. The ligands are typically organic compounds, often in anionic form, and can be referred to as chelants, chelators, or sequestering agents. A ligand forms a chelate complex with a substrate such as a metal ion. While chelate complexes typically form from polydentate ligands, as used herein the term chelate also refers to coordination complexes formed from monodentate ligands and a central atom. Mineral chelated compositions include chelation.

A "carboxylic acid" refers to organic acids characterized by the presence of a carboxyl group, which has the formula —C(=O)OH, often written —COOH or —$CO_2H$. Examples of carboxylic acids include lactic acid, acetic acid, EDTA, propionic acid and butyric acid.

A "fatty acid" refers to a carboxylic acid, often with a long unbranched aliphatic tail (chain), which may be either saturated or unsaturated. Short chain fatty acids typically have aliphatic tails of six or fewer carbon atoms. Examples of short chain fatty acids include lactic acid, propionic acid and butyric acid. Medium chain fatty acids typically have aliphatic tails of 6-12 carbon atoms. Examples of medium chain fatty acids include caprylic acid, capric acid and lauric acid. Long chain fatty acids typically have aliphatic tails of greater than 12 carbon atoms. Examples of long chain fatty acids include myristic acid, palmitic acid and stearic acid. A fatty acid having only one carboxylic acid group can be a ligand of a mineral.

The term "lactic acid" refers to a carboxylic acid having the chemical structural formula of $CH_3CH(OH)CO_2H$. Lactic acid forms highly soluble chelates with many important minerals.

As used herein, an "inorganic mineral compound" or "mineral" refers to an elemental or compound composition including one or more inorganic species. For example, an inorganic mineral compound may be cobalt, cobalt carbonate, zinc oxide, cupric oxide, manganese oxide or a combination thereof. Inorganic mineral compounds may also include scandium, selenium, titanium, vanadium, chromium, manganese, iron, nickel, copper and zinc, for example. Transition metals can also be included and salts, oxides, hydroxides and carbonates of the above mentioned compounds can be suitable inorganic mineral compounds.

As used herein, "mineral chelated compound" refers to chemical compound or mixture including at least one inorganic substance and a derivative of a carboxylic acid, or reaction product of a carboxylic acid and an inorganic mineral compound. Examples of mineral chelated compounds include but are not limited to cobalt, scandium, selenium, titanium, vanadium, chromium, manganese, iron, nickel, copper, zinc, or a combination thereof chelated to one or more ligands to form a chelate (a chelate complex or coordinate complex). Examples of suitable ligands include lactate, acetate, propionate, butyrate, ethylene diamine, and EDTA.

As used herein, "rapidly soluble mineral chelated product" refers to a mineral chelated compound that has been altered to increase solubility in a solvent. Altering may include reducing in size, filtering, screening or chemically reacting. An inorganic mineral compound may be organically chelated such that its solubility changes from insoluble to soluble in a chosen solvent.

As used herein, "solution" refers to a homogeneous or substantially homogeneous mixture of two or more substances, which may be solids, liquids, gases or a combination thereof.

As used herein, "mixture" refers to a combination of two or more substances in physical or chemical contact with one another.

As used herein, "feed" refers to food for a subject.

As used herein, "feed supplement" refers to something added to a feed or food to remedy a deficiency, strengthen or increase the value of the feed or food.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. Accordingly, treating, tumbling, vibrating, shaking, mixing, and applying are forms of contacting to bring two or more components together.

As used herein, "applying" refers to bringing one or more components into nearness or contact with another component. Applying can refer to contacting or administering.

As used herein, "administering" refers to contacting a subject with a substance, or giving or applying a substance to a subject. For example, administering can include providing a substance to a subject such that the subject ingests the substance, such as through feeding or medication. Administering can also include topical applications, among others.

As used herein, "reacting" refers to undergoing a chemical change. Reacting may include a change or transformation in which a substance oxidizes, reduces, decomposes, combines with other substances, or interchanges constituents with other substances.

As used herein, "transferring" refers to moving a component or substance from one place or location to another.

As used herein, "mold" refers to a hollow form or matrix for shaping a fluid, gel, semi-solid or plastic substance.

As used herein, "filtering" or "filtration" refers to a mechanical method to separate solids from liquids, or separate components by size or shape. This can be accomplished by gravity, pressure or vacuum (suction).

As used herein, "screening" refers to separating components by size by passing or refusing to pass components through a screen or mesh.

As used herein, "mesh size" refers to the number of openings in one inch of a screen or filter.

As used herein, "reducing in size" refers to physically or chemically reducing the size of one or more components by, for example, grinding, crushing, or milling.

As used herein, "carrier" refers to a substance that physically or chemically binds or combines with a target or active substance to facilitate the use, storage or application of the target or active substance. Carriers are often inert materials, but can also include non-inert materials when compatible with the target or active substances. Examples of carriers include, but are not limited to, water for compositions that benefit from a liquid carrier, or diatomaceous earth for compositions that benefit from a solid carrier.

As used herein, "substrate" refers to a base layer or material on which an active or target material interacts with, is applied to, or acts upon.

As used herein, "stoichiometric" or "stoichiometric amounts" refer to starting materials of a reaction having molar amounts or substantially molar amounts such that the reaction product is formed with little to no unused starting material or waste. A stoichiometric reaction is one in which all starting materials are consumed (or substantially consumed) and converted to a reaction product or products.

As used herein, "adherent" refers to a material, such as a polymer, that facilitates contact or binding of one or more chemicals with a seed during a seed-pre-treatment process.

As used herein, "enzymes" refers to one or more biological molecules capable of breaking down cellulosic material.

As used herein, "MCMS compositions" refer to a composition having one or more mineral chelate compounds and one or more mineral salt compounds. A specific example of a MCMS composition is one which contains cobalt lactate and cobalt sulfate, and optionally one or more other chemical species.

As used herein, "plants" and "plant derivatives" can refer to any portion of a growing plant, including the roots, stems, stalks, leaves, branches, seeds, flowers, fruits, and the like.

For example, cinnamon essential oil can be derived from the leaves or bark of a cinnamon plant.

As used herein, the term "essential oil" can refer to a volatile chemical compound or a mixture comprising such a compound.

As used herein, the term "essential oil" can refer to a volatile chemical compound or a mixture comprising a volatile chemical compound, either of which can be derived from plant material or prepared synthetically.

As used herein, the term "essential oils" generally refers to mixtures of volatile compounds that have been derived from plant material or prepared synthetically. Accordingly, the term "essential oils" refers to both natural essential oils and synthetic essential oils. A natural essential oil generally refers to mixtures of volatile compounds derived from plant material. A synthetic essential oil generally refers to a synthetically-made compound or mixture that is chemically similar to a plant-derived compound or mixture. Unless otherwise provided, for simplicity, the term "essential oil(s)" also refers to component(s)/constituent(s) of essential oils. Examples of classes into which essential oil components/constituents fall include, but are not limited to, terpenes (e.g., p-Cymene, limonene, sabinene, a-pinene, y-terpinene, b-caryophyllene), terpenoids (e.g., citronellal, thymol, carvacrol, carvone, borneol) and phenylpropanoids (e.g., cinnamaldehyde, eugenol, vanillin, safrole). In instances where more specificity is needed, components of essential oils will be expressly referred to. In addition, in some instances, the present disclosure refers to an "essential oil fraction" in the context of essential oil compositions, which also comprise one or more additional components, such as carriers, emulsifiers, etc. Accordingly, the "essential oil fraction" refers to the portion of an essential oil composition comprising the "essential oils."

As used herein "cinnamon essential oil" refers to one or more of natural cinnamon oil (i.e., essential oil derived from plants in the *Cinnamomum* genus), or synthetic cinnamon oil. Synthetic cinnamon essential oil can comprise synthetic cinnamaldehyde. Synthetic cinnamon essential oil can further comprise one or more major constituents of natural cinnamon essential oil. A major constituent is one which comprises at least 1 wt. %, at least 2.5 wt. %, or at least 5 wt. % of a natural essential oil assay.

As used herein "thyme essential oil" refers to one or more of natural thyme oil (i.e., essential oil derived from plants in the *Thymus* genus), or synthetic thyme oil. Synthetic thyme essential oil can comprise synthetic thymol. Synthetic thyme essential oil can further comprise one or more major constituents of natural thyme essential oil.

As used herein "oregano essential oil" refers to refers to one or more of natural oregano oil (i.e., essential oil derived from plants in the *Origanum* genus), or synthetic oregano oil. Synthetic oregano essential oil can comprise synthetic carvacrol. Synthetic oregano essential oil can further comprise one or more major constituents of natural oregano essential oil.

As used herein, the term "emulsion" refers to a fine dispersion of droplets of one liquid in which the liquid is not substantially soluble or miscible. An essential oil may be emulsified or substantially emulsified within an aqueous carrier, for example.

As used herein, the term "emulsifier" refers to a substance that stabilizes an emulsion. The emulsifier can utilize physical properties, chemical properties, or utilize both physical and chemical properties to interact with one or more substances of an emulsion. Tannic acid is an example of an emulsifier for essential oils and water.

As used herein, the term "tannin compound" refers to a polyphenolic biomolecule including at least twelve hydroxyl groups and at least five phenyl groups. Tannin compounds include compounds utilizing gallic acid, flavone and phloroglucinol as base units. Tannic acid ($C_{76}H_{52}O_{46}$) is one form of a tannin compound. Tannic acid can include quercitannic acid and gallotannic acid, for example.

As used herein, "carrier" refers to a substance that physically binds or combines, or chemically binds or combines, with a target or active substance to facilitate the use, storage, or application of the target or active substance. Carriers are often inert materials, but can also include non-inert materials when compatible with the target or active substances. Examples of carriers include, but are not limited to, water for compositions that benefit from a liquid carrier, or diatomaceous earth for compositions that benefit from a solid carrier.

As used herein, "enzymes" refers to one or more biological molecules capable of breaking down cellulosic material. Enzymes include starch, proteins, non-starch polysaccharides, both soluble and insoluble, lignins and those biological molecules that facilitate chemical reactions within plants and animals.

As used herein, "animal" refers to any and all living organisms, including humans. Non-limiting examples of animals include livestock, such as poultry, swine, ruminants, and horses; zoo animals; and fish, including shellfish such as shrimp, and other aquatic animals. Further examples of animals may include birds, reptiles, mammality, amphibian animals, and the like. Additional examples of animals include, without limitation, avian, bovine, canine, equine, feline, hircine, murine, ovine, and porcine animals, such as poultry, swine, beef cattle, horses, dogs, cats, goats, sheep, and the like. The term "poultry" refers to birds of the order Galliformes including ordinary domestic fowl or chicken (*Gallus domesticus*), turkeys (*Meleagris*), pheasants (*Phasianus*), partridges (*Perdix*), grouse (*Lagopus*), guinea fowl (*Numida*) peacocks (*Pavo*), and also birds of the order Anseriformes such as ducks (*Anas*) and geese (*Anser*). Examples of aquaculture species may include, without limitation, fish, crustaceans, molluscs, aquatic plants, algae, and/or other organisms. In some embodiments, the aquaculture species may include an aquatic species that is present, either fully or partially, in an aquatic environment, such as one or more of aquaculture fish and invertebrates. Non-limiting examples of the aquaculture species include one or more of carp (e.g., goldfish, koi, Grass Carp, Silver Carp, Common Carp, Bighead Carp, Major Carp, Rohu, etc.), catfish (e.g., Channel catfish etc.), tilapia (e.g., Nile tilapia, etc.), trout (e.g., rainbow trout, etc.), salmon (e.g., Atlantic salmon), crawfish or crayfish, bass (e.g., striped bass, Largemouth Bass, etc.), baitfish, goldfish, koi, clownfish, shrimp (e.g., Whiteleg shrimp or *Penaeus vannamei*, Tiger Shrimp, etc.), oysters, lobster, clams, and mussels. These shall not be limiting.

Feed Compositions

Embodiments of the present disclosure describe feed compositions for enhancing immunity and/or digestion in animals. The feed compositions may comprise any combination of one or more of the following components:

(a) one or more mineral compounds;
(b) one or more essential oils;
(c) one or more emulsifiers;
(d) one or more fibers; and
(e) one or more yeast extracts.

The feed compositions can optionally further comprise one or more additional components. Examples of such additional components include, but are not limited to, carriers, enzymes, nutritional supplements, vitamins, chemical wetting agents, adherents, and dedusting agents. Additional components other than the ones just recited can be used and are described below. The feed compositions, or any component thereof, can be provided as a solid or solid mixture, liquid or liquid mixture, or solid-liquid mixture. In some embodiments, the feed compositions may be provided in liquid form, as a liquid, to promote efficient manufacturing of the feed compositions (e.g., via micromachines). The feed compositions may be provided as suspensions, colloidal dispersions, and the like. The feed compositions may be wet or dry (e.g., include or exclude moisture).

The proportion of each of the components of the feed composition can be varied to achieve select enhancements in immunity or digestion, or both. The proportion of each component can also depend on the animal to be administered the feed composition. The proportion of each component is thus not particularly limited. For example, the proportion of mineral compounds can be in the range of about 0 wt. % to about 100 wt. %; the proportion of essential oils can be in the range of about 0 wt. % to about 100 wt. %; the proportion of emulsifiers can be in the range of about 0 wt. % to about 100 wt. %; the proportion of fibers can be in the range of about 0 wt. % to about 100 wt. %; the proportion of carriers can be in the range of about 0 wt. % to about 100 wt. %; and the proportion of each of the additional components can be in the range of about 0 wt. % to about 100 wt. %. The feed compositions may include any incremental value or subrange between the aforementioned ranges for each respective component. Unless otherwise provided, all percentages by weight are based on the total weight of the composition.

Minerals Compounds

The feed compositions can comprise one or more mineral compounds. The mineral compounds can include a mineral component and optionally a non-mineral component. The mineral component can be selected from metals, non-metals, or polysaccharides. Suitable mineral components include, but are not limited to, lithium, sodium, magnesium, aluminum, potassium, calcium, scandium, titanium, vanadium, chromium, manganese, iron, cobalt, nickel, copper, zinc, selenium, rubidium, strontium, zirconium, molybdenum, silver, tin, iodine, gold, chitosan, or combinations thereof. The mineral component typically binds to the non-mineral component, or is at least capable of binding to the non-mineral component, although the formation of such a bond is not required.

The non-mineral component, if present, thus can be selected from any chemical species capable of binding or associating with the mineral component (e.g., to form chelates, complexes, salts, etc.). For example, in some embodiments, the non-mineral component includes a ligand, and the ligand complexes with the mineral component to form a mineral chelate or mineral chelate compound. In some embodiments, the non-mineral component includes a counterion, which can be organic or inorganic, and the counterion combines with the mineral component to form a mineral salt or mineral salt compound. Suitable non-mineral components include, but are not limited to, formate, acetate, oxalate, lactate, propionate, butyrate, fumarate, valerate, caproate, citrate, sorbate, benzoate, enanthate, caprylate, pelargonate, caprate, laurate, myristate, palmitate, margarate, stearate, icosanoate, ethylenediamine tetraacetate (EDTA), ethylene diamine, bromide, chloride, fluoride, carbonate, hydroxide, nitrate, oxide, phosphate, sulfate, formate, acetate, propionate, butyrate, oxalate, citrate, malate, lactate, tartrate, or combinations thereof.

The mineral compounds may include any combination of one or more of the one or more mineral components and one or more nonmineral components. For example, in some embodiments, the mineral compounds include cobalt and at least one of acetate and lactate (e.g., cobalt acetate, cobalt lactate, etc.). This applies equally to all other mineral components and non-mineral components and thus shall not be limiting.

In some embodiments, the feed compositions comprise dissolved mineral compounds. For example, in some embodiments, the mineral compounds are present in the feed compositions in ionic form, as ions. In some embodiments, the feed compositions comprise undissolved mineral compounds. For example in some embodiments, a mineral compound is present in the feed composition as a solid (e.g., as solid particles, in the form of a powder, etc.). In some embodiments, the feed compositions comprise a dissolved and undissolved mineral compound, or a partially dissolved mineral compound. For example, in some embodiments, a portion of a mineral compound is dissolved and a portion of the mineral compound is undissolved or present as a solid. In some embodiments, one or more mineral compounds are provided or present in the form of hydrates, as mineral compound hydrates. Examples of hydrates include, without limitation, tetrahydrates, pentahydrates, hexahydrates, heptahydrates, octahydrates, nonahydrates, and so on.

In some embodiments, the mineral compounds include mineral chelates, mineral salts, or combinations thereof. Examples of mineral chelates include lithium chelates, sodium chelates, magnesium chelates, aluminum chelates, potassium chelates, calcium chelates, scandium chelates, titanium chelates, vanadium chelates, chromium chelates, manganese chelates, iron chelates, cobalt chelates, nickel chelates, copper chelates, zinc chelates, selenium chelates, rubidium chelates, strontium chelates, zirconium chelates, molybdenum chelates, silver chelates, tin chelates, iodine chelates, gold chelates, chitosan chelates, or combinations thereof. Examples of mineral salts include lithium salts, sodium salts, magnesium salts, aluminum salts, potassium salts, calcium salts, scandium salts, titanium salts, vanadium salts, chromium salts, manganese salts, iron salts, cobalt salts, nickel salts, copper salts, zinc salts, selenium salts, rubidium salts, strontium salts, zirconium salts, molybdenum salts, silver salts, tin salts, iodine salts, gold salts, chitosan salts, or combinations thereof.

In some embodiments, the mineral compounds include mineral formate, mineral acetates, mineral oxalates, mineral lactates, mineral propionates, mineral butyrates, mineral fumarates, mineral valerates, mineral caproates, mineral citrates, mineral sorbates, mineral benzoates, mineral enanthates, mineral caprylates, mineral pelargonates, mineral caprates, mineral laurates, mineral myristates, mineral palmitates, mineral margarates, mineral stearates, mineral icosanoates, mineral ethylenediamine tetraacetates (EDTA), mineral ethylene diamines, mineral bromides, mineral chlorides, mineral fluorides, mineral carbonates, mineral hydroxides, mineral nitrates, mineral oxides, mineral phosphates, mineral sulfates, mineral formates, mineral acetates, mineral propionates, mineral butyrates, mineral oxalates, mineral citrates, mineral malates, mineral lactates, mineral tartrates, or combinations thereof.

In some embodiments, the mineral compounds include at least cobalt lactate. In some embodiments, the mineral compounds include at least cobalt sulfate. In some embodiments, the mineral compounds include at least one compound selected from cobalt lactate, cobalt carbonate, cobalt gluconate, cobalt sulfate, cobalt oxides, or any combination thereof. In some embodiments, the cobalt, iron, manganese, copper, and zinc can be lactates, EDTA complexes, or sulfates, and the molybdenum can be hydrated molybdic acid.

In some embodiments, the feed compositions exclude ferric and/or ferrous content. One reason for excluding ferric and/or ferrous content, among many, is it may be difficult to provide a stable form of iron within certain compositions. In some embodiments, the feed compositions exclude nitrogen content. In some embodiments, the feed compositions exclude both ferric and/or ferrous content and nitrogen content.

Further embodiments of such general mineral complexes include one or more of a carrier, soluble fiber, and enzymes. Examples of such compounds and methods of making are described in co-owned U.S. patent application Ser. No. 12/835,545, the disclosure of which is herein incorporated by reference.

In some embodiments, the combined weight percent of the one or more mineral compounds by total weight of the feed composition on either a wet or dry basis, is in the range of 0.01 wt. % to about 100 wt. %, or any increment or value thereof. In some embodiments, the combined weight percent of one or more mineral compounds, by total weight of the feed composition, is up to about 0.1 wt. %, up to about 0.5 wt. %, up to about 1.0 wt. %, up to about 2 wt. %, up to about 3 wt. %, up to about 4 wt. %, up to about 5 wt. %, up to about 6 wt. %, up to about 7 wt. %, up to about 8 wt. %, up to about 9 wt. %, up to about 10 wt. %, up to about 11 wt. %, up to about 12 wt. %, up to about 15 wt. %, up to about 20 wt. %, up to about 22 wt. %, up to about 24 wt. %, up to about 26 wt. %, up to about 28 wt. %, up to about 30 wt. %, up to about 32 wt. %, up to about 34 wt. %, up to about 36 wt. %, up to about 38 wt. %, up to about 40 wt. %, up to about 42 wt. %, up to about 44 wt. %, up to about 46 wt. %, up to about 48 wt. %, up to about 50 wt. %, or any increment or value thereof, or at least one of the aforementioned weight percentages, or no more than the aforementioned weight percentages. In some embodiments, the feed compositions comprise up to about, no more than, or at least about 36% by weight cobalt lactate. In one embodiment, the feed compositions comprise up to about 3% or up to about 4% by weight of cobalt lactate.

In addition or in the alternative, the feed compositions can include one or more pairings of mineral compounds. In a pairing of mineral compounds, the same mineral component is paired with two different non-mineral components. In some embodiments, the pairing of mineral compounds is a MCMS composition, which comprises a mineral chelate and mineral salt that include the same mineral component. A non-limiting example of a MCMS composition is a cobalt compound pairing, such as cobalt lactate and cobalt sulfate.

In some embodiments, the MCMS composition includes one or more of a lithium chelate and lithium salt, sodium chelate and sodium salt, magnesium chelate and magnesium salt, aluminum chelate and aluminum salt, potassium chelate and potassium salt, calcium chelate and calcium salt, scandium chelate and scandium salt, titanium chelate and titanium salt, vanadium chelate and vanadium salt, chromium chelate and chromium salt, manganese chelate and manganese salt, iron chelate and iron salt, cobalt chelate and cobalt salt, nickel chelate and nickel salt, copper chelate and copper salt, zinc chelate and zinc salt, selenium chelate and selenium salt, rubidium chelate and rubidium salt, strontium chelate and strontium salt, zirconium chelate and zirconium salt, molybdenum chelate and molybdenum salt, silver chelate and silver salt, tin chelate and tin salt, iodine chelate and iodine salt, gold chelate and gold salt, and chitosan chelate and chitosan salt.

In some embodiments, the MCMS composition includes two or more of a lithium chelate and lithium, sodium chelate and sodium salt, magnesium chelate and magnesium salt, aluminum chelate and aluminum salt, potassium chelate and potassium salt, calcium chelate and calcium salt, scandium chelate and scandium salt, titanium chelate and titanium salt, vanadium chelate and vanadium salt, chromium chelate and chromium salt, manganese chelate and manganese salt, iron chelate and iron salt, cobalt chelate and cobalt salt, nickel chelate and nickel salt, copper chelate and copper salt, zinc chelate and zinc salt, selenium chelate and selenium salt, rubidium chelate and rubidium salt, strontium chelate and strontium salt, zirconium chelate and zirconium salt, molybdenum chelate and molybdenum salt, silver chelate and silver salt, tin chelate and tin salt, iodine chelate and iodine salt, gold chelate and gold salt, and chitosan chelate and chitosan salt.

In some embodiments, the molar ratio or weight ratio of the mineral component in the mineral chelate and in mineral salt can be in the range of 1:100 to 100:1. For example, in some embodiments, the molar or weight ratio of the mineral component in the mineral chelate to the mineral salt is in the range of 20:80 to 30:70. In some embodiments, the molar or weight ratio of the mineral component in the mineral chelate to the mineral salt is in the range of 21:79 to 25:75. In some embodiments, the molar or weight ratio of the mineral component in the mineral chelate to the mineral salt is in the range of 21:79 to 23:77. In some embodiments, the molar or weight ratio of the mineral component in the mineral chelate to the mineral salt is in the range of 50:40 to 90:10. In some embodiments, the molar or weight ratio of the mineral component in the mineral chelate to the mineral salt is in the range of 6:94 to 12:88.

In some embodiments, the combined weight percent of the mineral compound pairing or MCMS composition (e.g., combined weight percent of the mineral chelate and mineral salt pairing), by total weight of the feed composition on either a wet or dry basis, is in the range of 0.01 wt. % to about 100 wt. %, or any increment or value thereof. In some embodiments, the combined weight percent of one or more mineral compound pairings, by total weight of the feed composition, is up to about 0.1 wt. %, up to about 0.5 wt. %, up to about 1.0 wt. %, up to about 2 wt. %, up to about 3 wt. %, up to about 4 wt. %, up to about 5 wt. %, up to about 6 wt. %, up to about 7 wt. %, up to about 8 wt. %, up to about 9 wt. %, up to about 10 wt. %, up to about 11 wt. %, up to about 12 wt. %, up to about 15 wt. %, up to about 20 wt. %, up to about 22 wt. %, up to about 24 wt. %, up to about 26 wt. %, up to about 28 wt. %, up to about 30 wt. %, up to about 32 wt. %, up to about 34 wt. %, up to about 36 wt. %, up to about 38 wt. %, up to about 40 wt. %, up to about 42 wt. %, up to about 44 wt. %, up to about 46 wt. %, up to about 48 wt. %, up to about 50 wt. %, or any increment or value thereof, or at least one of the aforementioned weight percentages, or no more than the aforementioned weight percentages. In some embodiments, the feed compositions comprise up to about, no more than, or at least about 36% by weight cobalt lactate and cobalt sulfate.

In some embodiments, the MCMS compositions further comprise one or more additional mineral compounds, such as mineral chelates and/or mineral salts other than those included in the MCMS compositions. In such embodiments, the feed composition can comprise up to about 1%, up to about 2%, up to about 3%, up to about 4%, up to about 7%, up to about 9%, up to about 12%, up to about 17%, up to about 19%, up to about 23%, up to about 28%, or up to about 35%, by weight of one or more additional mineral compounds. For example, a feed composition can comprise cobalt lactate and cobalt sulfate, and one or more of ferric sodium EDTA, manganese lactate, copper sulfate, and zinc sulfate. In some embodiments, the feed composition can further comprise one or more mineral acids, such as molybdic acid.

In some embodiments, the MCMS compositions further comprise carriers, fibers, adherents, and/or enzymes, among other additional components. For example, a MCMS composition can comprise a mineral chelated compound (e.g. cobalt lactate), a mineral salt (e.g. cobalt sulfate), and a carrier (e.g. water).

In one embodiment, the MCMS composition can comprise cobalt lactate, cobalt sulfate, and one of a combination of manganese lactate and manganese sulfate, a combination of copper lactate and copper sulfate, a combination of nickel lactate and nickel sulfate, and a combination of zinc lactate and zinc sulfate. In some embodiments, the MCMS composition can comprise cobalt lactate, cobalt sulfate, and two of a combination of manganese lactate and manganese sulfate, a combination of copper lactate and copper sulfate, a combination of nickel lactate and nickel sulfate, and a combination of zinc lactate and zinc sulfate. In some embodiments, an MCMS composition can comprise can comprise cobalt lactate, cobalt sulfate, and three of a combination of manganese lactate and manganese sulfate, a combination of copper lactate and copper sulfate, a combination of nickel lactate and nickel sulfate, and a combination of zinc lactate and zinc sulfate. In some embodiments, the MCMS composition can comprise cobalt lactate, cobalt sulfate, manganese lactate and manganese sulfate, copper lactate and copper sulfate, nickel lactate, nickel sulfate, zinc lactate and zinc sulfate. In some embodiments, the MCMS composition can comprise two of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate. In some embodiments, the MCMS composition can comprise three of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate. In some embodiments, the MCMS composition can comprise four of a combination of cobalt lactate and cobalt sulfate, a combination of manganese lactate and manganese sulfate, a combination of copper lactate and copper sulfate, a combination of nickel lactate and nickel sulfate, and a combination of zinc lactate and zinc sulfate.

In some embodiments, the MCMS compositions can comprise a pairing of one or more chelates and one or more salts of a mineral. For example, the MCMS composition can comprise cobalt lactate, cobalt propionate, and cobalt sulfate. Similarly, the MCMS composition can comprise cobalt lactate, cobalt sulfate, and cobalt carbonate. In some embodiments, the MCMS compositions further comprise cobalt gluconate.

All such embodiments may be a dry mixture of components. Such embodiments may also provide varying ranges of viscosities, such that the composition may be a paste, or the like. Further, embodiments may comprise aqueous solutions, or aqueous dispersions or suspensions.

Essential Oils

In this disclosure, the novel utility of multi-essential oil compositions will be demonstrated. This disclosure relates to compositions including essential oils for enhancing feed efficiency and health of a subject. In many embodiments, subjects include animals. Enhancing feed efficiency can increase the growth rate, weight, weight gain rate, and nutrition of an animal. Enhanced health generally includes one or more of reduced or eliminated microbial infection, reduced or eliminated oxidative stress, reduced or eliminated infection or death during transport, reduced or eliminated microbial infection, increased body weight, enhanced egg characteristics, increased rate of weight gain, increased growth rate, reduced or eliminated birth mortality, increased or improved body score conditions, increased reproductive success, and increased gut health maturation.

Reproductive success refers to general health outcomes and effects of both the mother and the young. Maturation of the gut can include developing beneficial indigenous microflora within the gut. Enhanced egg characteristics can include one or more of increased egg size uniformity, increased egg shape uniformity, increased egg size, increased numbers of eggs laid per clutch, increased egg clutch frequency, increased egg hatchability, increased egg shell thickness, increased egg shell thickness uniformity. Enhanced egg characteristics can be achieved in all oviparous and ovuliparous animals, which include fish, amphibians, reptiles, birds, monotremes, insects, molluscs, and arachnids. As used herein, "clutch" refers to a single period or instance of egg laying for all oviparous and ovuliparous animals.

Enhanced health can include various benefits specific to a certain class of animals. For example, enhanced health in poultry can include increased growth rate, feed efficiency, egg shell thickness and mortality rate. Enhanced health in dairy cows, or other milk-producing animals such as camels, goats, and sheep, can include increased milk production. In swine, for example, enhanced health can include a reduction or elimination of wasting diseases and mulberry heart.

Oxidative stress can include oxidative damage of tissues and cellular components, and is known to be a primary or secondary cause of many animal diseases. Oxidative stress can be measured by the concentration of reactive oxygen species (ROS) in a subject. In general, the five most damaging ROS include peroxyl radicals (e.g., $R-O_2$; oxidation of polyunsaturated fatty acids by $OH^-$), hydroxyl radicals ($OH^-$), peroxynitrite (e.g., $ONO^{2-}$; $H_2O_2+NO^{2-}$), superoxide anion (e.g., $O^{2-}$), and singlet oxygen ($1O_2$). In animals, a variety of ROS are naturally produced through metabolic processes and by certain leukocyte populations during immune responses against disease. For example, the superoxide anion is produced by ATP synthesis. Environmental sources such as UV radiation can also increase ROS prevalence in an animal. For example, a grazing animal may have a higher singlet oxygen concentration from increased exposure to sunlight. ROS can damage cells through direct oxidation, or indirectly by inciting chemical and/or biological chain reactions which damage cells.

Antioxidants are molecules which are capable of slowing or preventing the oxidation of other molecules, and can be hydrophilic or lipophilic. Hydrophilic antioxidants can react with ROS in cell cytoplasm and blood plasma, for example. Lipophilic antioxidants can protect cell membranes from lipid peroxidation, for example. Host animals naturally produce antioxidants (e.g., glutathione, superoxide dismutase, catalase, peroxidases, uric acid, vitamin C) but stressors such as pregnancy, birthing, lactating, and accelerated growth can render natural antibiotic production inadequate for counteracting the increased ROS concentration. An increased ROS concentration can result from the host's reduced ability to produce antioxidants, a higher accumulation of ROS from natural bodily functions, a higher accumulation of ROS from environmental factors, a higher accumulation of ROS from increased host accumulation susceptibility, and combinations thereof.

Animals are commonly administered antioxidants to counteract ROS and reduce oxidative stress, but excessive oxidative stress can diminish the efficacy of many antioxidants or create a threshold ROS level above which antioxidants are no longer effective. For example, metabolic insufficiency in an animal can prevent vitamin E or other antioxidants available in tissue and blood from counteracting ROS.

Essential oil compositions as described herein can provide antioxidant properties to a host system and generally reduce oxidative stress in animals. Essential oil compositions provided herein have high oxygen radical absorbance capacity (ORAC), which is the ability of a compound or composition to act as a proton donor and reducing agent for oxygen radicals. While many antioxidants are only effective against single ROS, the essential oil compositions provided herein have high ORAC against peroxyl radicals, hydroxyl radicals, peroxynitrite, superoxide anions, and singlet oxygen, among others. Moreover, essential oil compositions provided herein comprise both lipophilic and hydrophilic characteristics which provide complete cellular protection against ROS. For example, essential oil compositions provided herein can neutralize ROS both in cytoplasm and cell walls.

The essential oil compositions as provided herein can further be used as analogous or preferable substitutes for many commercial products used today, such as coccidiostats, subtherapeutic antibiotics, growth hormones, and other similar products. As such, a financial gain is realized by those selling milk, eggs, and meat products from animals consuming the compositions provided as the products can be more readily sold as "Natural", "Organic", "hormone-free", and/or "Antibiotic-Free".

Accordingly, the feed compositions can comprise one or more essential oils. The essential oils can be derived from plants (i.e., "natural" essential oils) and additionally or alternatively their synthetic analogues. Some embodiments comprise a combination of natural and synthetic essential oils. In some embodiments, synthetic essential oils can be a "nature's equivalent" synthetic blend, which generally mimics an essential oil assay of a natural essential oil by including at least 2, at least 5, at least 10, at least 15, at least 20, or any increment thereof, of the most critical essential oils within a natural essential oil. A critical essential oil can be determined by weight percent, and/or by pharmacological efficacy. For example, in one embodiment, a nature's equivalent synthetic oil can comprise the following constitutions as provided in Table 1:

TABLE 1

Nature's Equivalent Synthetic Thyme Essential Oil:

| Constituent | Wt. % |
|---|---|
| Thymol | 42.7-44.08 |
| para-Cymene | 26.88-27.09 |
| Linalool | 4.3-4.34 |
| alpha-Pinene | 4.1-4.26 |
| alpha-Terpineol | 3.14-3.14 |

TABLE 1-continued

Nature's Equivalent Synthetic Thyme Essential Oil:

| Constituent | Wt. % |
|---|---|
| 1,8-Cineole | 2.82-3.01 |
| beta-Caryophellene | 1.98-2.27 |
| Limonene | 1.59-1.78 |
| delta-3-Carene | 1.3-1.41 |
| beta-Myrcene | 1.26-1.31 |
| Linalyl Acetate | 1.11-1.24 |
| beta-Pinene | 1.04-1.22 |
| Terpinen-4-ol | 0.96-1.14 |
| alpha-Caryophyllene | 0.71-0.71 |
| gamma-Terpinene | 0.7-0.7 |
| Sabinene | 0.37-0.5 |
| Borneol | 0.27-0.32 |
| Camphene | 0.13-0.17 |

The disclosure herein indicates the efficacy of compositions comprising a plurality of essential oils which provide a synergistic effect beyond essential oils utilized in isolation. Further, the essential oils do not exhibit any antagonistic effects between essential oil moieties within an essential oil composition or feed composition. An essential oil composition can include an essential oil fraction and one or more additional components. The ratio of the essential oil fraction to the one or more additional components in an essential oil composition can depend on several factors such as administration method, and the nutritional/health needs and/or palate of a consuming subject, among others. In some embodiments, a consuming subject comprises animals. In some embodiments, a consuming subject comprises humans. Compositions can comprise additional components including carriers, emulsifiers, and stabilizers, among others. Compositions as provided herein can be in the form of an emulsion. For example, in some embodiments, the feed compositions comprise an essential oil composition, wherein the essential oil composition comprises one or more essential oils and at least one emulsifier, wherein the one or more essential oils are present as an emulsion.

In some embodiments, the essential oils include oils from the classes of terpenes, terpenoids, phenylpropenes, or combinations thereof. In some embodiments, the essential oils include oils of plants from the Labiatae or Lamiaceae family, and the Lauraceae family, including hybrids of plants from one or both families. Suitable essential oils from the Lauraceae family can comprise those from the *Cinnamomum* genus. Within the *Cinnamomum* genus, suitable species can include *Cinnamomum burmannii, Cinnamomum cassia, Cinnamomum camphora, Cinnamomum loureiroi, Cinnamomum mercadoi, Cinnamomum oliveri, Cinnamomum osmophloeum, Cinnamomum ovalifolium, Cinnamomum parthenoxylon, Cinnamomum pedunculatum, Cinnamomum subavenium, Cinnamomum tamala, Cinnamomum verum, Cinnamomum verum*, and hybrids thereof.

Suitable essential oils from the Lamiaceae family can comprise those from one or more of the *Thymus* genus, the *Origanum* genus, the *Monarda* genus. Within the *Thymus* genus, a non-limiting list of suitable species can include *Thymus caespititius, Thymus capitatus, Thymus carnosus, Thymus citriodorus, Thymus glandulosus, Thymus herbabo-rana, Thymus hyemalis, Thymus integer, Thymus pseudolanuginosus* (formerly *T. lanuginosus*), *Thymus mastichinia, Thymus montanus, Thymus moroderi, Thymus pannonicus, Thymus praecox, Thymus pulegioides, Thymus serpyllum, Thymus vulgaris, Thymus zygis*, and hybrids thereof. Within the *Origanum* genus, a non-limiting list of suitable species can include *Origanum amanum, Origanum compactum, cordifolium, Origanum dictamnus, Origanum laevigatum, Origanum libanoticum, Origanum majorana, Origanum microphyllum, Origanum onites, Origanum rotundifolium, Origanum scabrum, Origanum syriacum, Origanum vulgare*, and hybrids thereof. Within the *Monarda* genus, a non-limiting list of suitable species can include *Monarda citriodora, Monarda clinopodioides, Monarda didyma, Monarda fistulosa, Monarda media, Monarda punctata*, and hybrids thereof.

Additional examples of essential oils include, without limitation, one or more of the following essential oils: *Cassia* redistilled Chinese oil, thyme oil red, *Origanum*, natural oregano, *Origanum* oil (organic), thyme white food grade, mustard oil, rosemary essential oil, organic oregano, cinnamon bark oil, thyme oil white, allspice leaf oil, thyme oil red organic, cinnamon bark oil organic, clove bud redistilled oil, clove leaf redistilled oil, anise star oil, basil Indian oil, caraway oil, spearmint far west native, rosemary Spanish oil, lemongrass Indian oil, peppermint Chinese type, palmarosa Indian oil, lavadin grosso American oil, rosemary Moroccan oil, marjoram sweet oil, rosemary organic oil, rosemary verbenone organic oil, lavender spike pure oil, juniper berry oil, petitgrain oil, *Eucalyptus* glob organic oil, coriander seed oil, balsam Peru oil, citronella java oil, garlic Chinese oil, bergamot BF oil, Ginger Chinese Oil, Chamomile Roman Oil, Tangerine oil, Melissa oil, pepper black Indian oil, lime expressed mexican oil, lemon argentina oil, cardamom $CO_2$ oil, carrot seed oil, nutmeg oil, fennel sweet oil, organic turmeric essential oil, grapefruit pink oil, grapefruit white oil, grapefruit red oil, mandarin green Italian oil, mandarin red oil, oleoresin *Capsicum* ($10^6$) oil, and the like.

In some embodiments, the essential oils can further include lavender essential oils from the *Lavandula* genus, Mexican bay leaf essential oils from the *Liteas* genus (e.g., *L. glaucescens*), West Indian bay tree essential oils from the *Pimenta* genus (e.g., *P. racemosa*), Indonesian bay leaf essential oils from the *Syzygium* genus, bay laurel essential oils from the *Laurus* genus (e.g., *L. nobilis*), California bay laurel essential oils from the *Umbellularia* genus (e.g., *U. californica*), lemon grass essential oils from the *Cymbopogon* genus (e.g., *C. ambiguous, C. citratus, C. flexuosus, C. martini, C. nardus, C. schoenanthus*), spearmint and peppermint essential oils from the *Mentha* genus (e.g., *M. spicata, M. piperita*), rosemary essential oils from the *Rosmarinus* genus (e.g., *R. officinalis*), sage essential oils from the *Salvia* genus (e.g., *S. sclarea*), hybrids thereof, or combinations thereof.

In some embodiments, an essential oil composition can include an essential oil fraction comprising three essential oils from the Lauraceae family and/or the Lamiaceae family. In some embodiments, an essential oil composition can include an essential oil fraction comprising cinnamon essential oil from the *Cinnamomum* genus, thyme essential oil from the *Thymus* genus, and oregano essential oil the *Origanum* genus. In some embodiments, an essential oil composition can include an essential oil fraction comprising synthetic cinnamaldehyde and thyme essential oils from the *Thymus* genus and oregano essential oil from the *Origanum* genus. In some embodiments, oregano essential oil can comprise carvacrol. Additionally or alternatively, thyme essential oil can comprise thymol.

In some embodiments, the essential oil fraction can comprise about 1% to about 49.5% oregano essential oil, about 1% to about 49.5% thyme essential oil, and about 1% to about 49.5% cinnamon essential oil. In other embodiments, the essential oil fraction can comprise about 5% to about 47.5% oregano essential oil, about 5% to about 47.5% thyme essential oil, and about 5% to about 47.5% cinnamon essential oil. In other embodiments, the essential oil fraction can comprise about 10% to about 45% oregano essential oil, about 10% to about 45% thyme essential oil, and about 10% to about 45% cinnamon essential oil. In other embodiments, the essential oil fraction can comprise about 15% to about 42.5% oregano essential oil, about 15% to about 42.5% thyme essential oil, and about 15% to about 42.5% cinnamon essential oil. In other embodiments, the essential oil fraction can comprise about 20% to about 40% oregano essential oil, about 20% to about 40% thyme essential oil, and about 20% to about 40% cinnamon essential oil. In other embodiments, the essential oil fraction can comprise about 25% to about 37.5% oregano essential oil, about 25% to about 37.5% thyme essential oil, and about 25% to about 37.5% cinnamon essential oil. In other embodiments, the essential oil fraction can comprise about 30% to about 35% oregano essential oil, about 30% to about 35% thyme essential oil, and about 30% to about 35% cinnamon essential oil. In other embodiments, the essential oil fraction can comprise about 33.33% oregano essential oil, about 33.33% thyme essential oil, and about 33.33% cinnamon essential oil.

Many essential oil compositions comprise an essential oil fraction comprising an effective amount of carvacrol, an effective amount of thymol, and an effective amount of cinnamaldehyde. In an essential oil composition including an essential oil fraction comprising oregano essential oil, thyme essential oil, and cinnamon essential oil, the essential oil fraction can comprise three or more natural essential oils wherein the combined essential oils comprise at least an effective amount of carvacrol, at least an effective amount of thymol, and at least an effective amount of cinnamaldehyde. Suitable essential oils can include essential oils from the *Cinnamomum* genus, essential oils from the *Origanum* genus, essential oils from the *Thymus* genus, essential oils from the *Monarda* genus (e.g., *M. citriodora, M. clinopodioides, M. didyma, M. fistulosa, M. media, M. punctata*), essential oils from the *Trachyspermum* genus (e.g., *T. ammi*), essential oils from the *Nigella* genus (e.g., *N. sativa*), and combinations thereof. Other essential oils can be used such that effective amounts of carvacrol, thymol, and cinnamaldehyde are achieved in the essential oil fraction.

In an essential oil composition including an essential oil fraction comprising oregano essential oil, thyme essential oil, and synthetic cinnamaldehyde, the essential oil fraction can comprise two or more natural essential oils and synthetic cinnamaldehyde, wherein the combined essential oils and synthetic cinnamaldehyde comprise at an effective amount of carvacrol, at least an effective amount of thymol, and at least an effective amount of cinnamaldehyde. Suitable essential oils can include essential oils from the *Cinnamomum* genus, essential oils from the *Origanum* genus, essential oils from the *Thymus* genus, essential oils from the *Monarda* genus (e.g., *M. didyma*, and *M. fistulosa*), essential oils from the *Trachyspermum* genus (e.g., *T. ammi*), essential oils from the *Nigella* genus (e.g., *N. sativa*), and combinations thereof. Still other natural essential oils can be used such that effective amounts of carvacrol, thymol, and cinnamaldehyde are achieved in the essential oil fraction.

In some embodiments, the feed compositions can comprise about 0% to about 100% by weight essential oil(s) or essential oil compound(s). In some embodiments, the weight percent of the essential oil composition, by total weight of the feed composition, is about or up to about 0.1 wt. %, up to about 0.5 wt. %, up to about 1.0 wt. %, up to about 2 wt. %, up to about 3 wt. %, up to about 4 wt. %, up to about 5 wt. %, up to about 6 wt. %, up to about 7 wt. %, up to about 8 wt. %, up to about 9 wt. %, up to about 10 wt. %, up to about 11 wt. %, up to about 12 wt. %, up to about 15 wt. %, up to about 20 wt. %, up to about 22 wt. %, up to about 24 wt. %, up to about 26 wt. %, up to about 28 wt. %, up to about 30 wt. %, up to about 32 wt. %, up to about 34 wt. %, up to about 36 wt. %, up to about 38 wt. %, up to about 40 wt. %, up to about 42 wt. %, up to about 44 wt. %, up to about 46 wt. %, up to about 48 wt. %, up to about 50 wt. %, or any increment or value thereof, or at least one of the aforementioned weight percentages, or no more than the aforementioned weight percentages.

Some essential oil compositions comprise an essential oil fraction comprising an effective amount of carvacrol, an effective amount of thymol, and an effective amount of cinnamaldehyde. An effective amount of carvacrol can comprise at least about 10 wt. %, at least about 15 wt. %, at least about 20 wt. %, at least about 25 wt. %, at least about 30 wt. %, or at least about 33 wt. % of the essential oil fraction. An effective amount of thymol can comprise at least about 10 wt. %, at least about 15 wt. %, at least about 20 wt. %, at least about 25 wt. %, at least about 30 wt. %, or at least about 33 wt. % of the essential oil fraction. An effective amount of cinnamaldehyde can comprise at least about 10 wt. %, at least about 15 wt. %, at least about 20 wt. %, at least about 25 wt. %, at least about 30 wt. %, or at least about 33 wt. % of the essential oil fraction. In some embodiments, oregano essential oil can be replaced by one or more oils which include at least 45 wt. % carvacrol, at least 55 wt. % carvacrol, at least 65 wt. % carvacrol, or at least 75 wt. % carvacrol. In some embodiments, thyme essential oil can be replaced by one or more oils which include at least 30 wt. % thymol, at least 35 wt. % thymol, at least 40 wt. % thymol, or at least 45 wt. % thymol. In some embodiments, cinnamon essential oil can be replaced by one or more oils which include at least 35 wt. % cinnamaldehyde, at least 40 wt. % cinnamaldehyde, at least 50 wt. % cinnamaldehyde, or at least 75 wt. % cinnamaldehyde. Suitable sources of effective amounts of carvacrol, thymol, and/or cinnamaldehyde can include natural essential oils and/or synthetic essential oils.

Essential oil compositions can further comprise one or more of an effective amount of paracymene, an effective amount of eugenol, or an effective amount of citronella. An effective amount of paracymene can comprise at least about 5 wt. %, at least about 7.5 wt. %, at least about 10 wt. %, or at least about 12.5 wt. % of the essential oil fraction. An effective amount of eugenol can comprise at least about 5 wt. %, at least about 7.5 wt. %, at least about 10 wt. %, or at least about 12.5 wt. % of the essential oil fraction. An effective amount of citronella can comprise at least about 5 wt. %, at least about 7.5 wt. %, at least about 10 wt. %, or at least about 12.5 wt. % of the essential oil fraction.

In some embodiments, the essential oil fraction comprises 100% of the essential oil composition. An essential oil composition can further comprise a carrier. Carriers are ideally inert materials which do not react with the active components (i.e., the essential oil fraction) of the composition chemically, or bind the active components physically by adsorption or absorption. Liquid carriers include water, pure water, such as reverse osmosis water, milk, milk replacers, natural and/or commercial liquid feeds, or other liquids germane to animal dietary needs. Milk replacers can be formulated to generally mimic the content of milk. For example, a milk replacer can have a composition similar to that shown in Table 2:

TABLE 2

| Example Milk Replacer Formula | |
|---|---|
| Crude Protein, minimum | 22.50% |
| Lysine, minimum | 1.60% |
| Crude Fat, minimum | 16.50% |
| Crude Fiber, maximum | 0.50% |
| Calcium, minimum | 0.65% |
| Calcium, maximum | 1.15% |
| Phosphorus, minimum | 0.60% |
| Sodium, minimum | 0.50% |
| Sodium, maximum | 1.00% |
| Selenium, minimum | 0.25 ppm |
| Zinc, minimum | 50 ppm |

The composition can be at least about 50% liquid carrier by weight, at least about 75% liquid carrier by weight, at least about 85% liquid carrier by weight, or at least about 90% liquid carrier. In some embodiments, the composition will be about 80% to about 99% liquid carrier, about 85% to about 98% liquid carrier, about 90% to about 95% liquid carrier, or about 91% to about 94% liquid carrier. In other embodiments, the composition can be about 60% liquid carrier to about 74% liquid carrier, about 63% liquid carrier to about 71% liquid carrier, about 66% liquid carrier to about 68% liquid carrier, or about 67% liquid carrier.

Solid carriers can include limestone, diatomaceous earth, and animal feed. Carriers such as limestone, diatomaceous earth, and the like, are useful pre-feed carriers in that they may be first combined with an essential oil fraction to facilitate transportation and/or subsequent combination of the essential oil composition with a dry carrier such as animal feed. Animal feed can include hay, straw, corn husks, wheat, oats, barley, seeds, commercial livestock feed, and the like. In some embodiments where an essential oil composition comprises an essential oil fraction and a pre-feed carrier, the ratio of pre-feed carrier to the essential oil fraction can be at least 10:1, at least 15:1, at least 17:1, at least 18:1, or at least 20:1. In some embodiments, where an essential oil composition comprises an essential oil fraction and a carrier, with or without a pre-feed carrier, the ratio of carrier to the essential oil fraction can be at least about 1,000:1, at least about 4,500:1, at least about 9,000:1, at least about 20,000:1, at least about 35,000:1, or at least about 50,000:1.

The total amount of carrier in a composition can be determined based on the dietary needs of an animal, the tolerance of an animal to essential oil fraction, and other factors. Tolerance can include one or more of an animal's palatability and gastrointestinal tolerance to an essential oil fraction.

An essential oil composition can further comprise one or more dedusting agents. Dedusting agents can comprise vegetable oil, olive oil, mineral oil and the like. The amount of dedusting agent in an essential oil composition can be determined based on the amount required to keep dust low while also allowing a dry composition to be "free flowing". A suitable "free flowing" characteristic can be determined by a funnel flow test or free flow test. A dedusting agent can be included in a feed in an amount between about 5-40 lbs/ton.

Emulsifiers

The feed composition can comprise one or more emulsifiers. In some embodiments, one or more emulsifiers are added to an essential oil composition. An emulsified essential oil fraction can increase the efficacy of an essential oil composition when ingested by a subject, and can make essential oil compositions more palatable to animals which consume the compositions orally. An essential oil fraction can be combined with an emulsifier and a dry carrier, or alternatively an essential oil fraction can be combined with an emulsifier and a liquid carrier, as disclosed above, to form an emulsion. The emulsifier can be combined with an essential oil fraction in a ratio of about 3:1 to about 1:3, about 2:1 to about 1:2, about 1.5:1 to about 1:1.5, or about 1:1. An essential oil composition comprising an essential oil fraction, a liquid carrier, and an emulsifier can have an average essential oil droplet size of less than about 25 microns, less than about 15 microns, less than about 10 microns, less than about 7.5 microns, or less than about 5 microns. In some embodiments, the average droplet size is less than about 7 microns, less than about 6 microns, less than about 5 microns, less than about 4 microns, or less than about 3 microns. As used herein, "droplet size" refers to the average size of an essential oil droplet within an emulsion.

The feed composition and/or essential oil composition can comprise anywhere between about 0% to about 100% by weight emulsifier(s). An emulsifier combined with a liquid carrier can generally be referred to as a liquid emulsifier. In some embodiments, an emulsion can comprise up to about 35%, up to about 40%, up to about 45%, or up to about 50% essential oil fraction and emulsifier, with the balance comprising a liquid carrier. In some embodiments, an emulsion can comprise less than about 20%, less than about 15%, less than about 10%, about 5%, or less than about 5% essential oil fraction and emulsifier, with the balance comprising a liquid carrier. In some embodiments, an emulsion can comprise about 40% to about 60%, or about 45% to about 55% essential oil fraction and emulsifier, with the balance comprising a liquid carrier. In some embodiments, an emulsion can comprise about 1% to about 10%, about 2.5% to about 7.5%, or about 5% essential oil fraction and emulsifier, with the balance comprising a liquid carrier. In many embodiments the liquid carrier is water. The liquid carrier content can vary depending on the amount and type of emulsifier.

One or more emulsifiers can be used to form an emulsion. In some embodiments, one or more emulsifiers can additionally or alternatively be used as a stabilizer. Stabilizers can be used to alter the viscosity of an emulsion. Altering a viscosity can include maintaining a viscosity, increasing a viscosity, or decreasing a viscosity. A suitable emulsifier can be an emulsifier capable of achieving a threshold droplet size. In some embodiments a suitable emulsifier can achieve a suitable emulsion droplet size of less than about 25 microns, less than about 15 microns, less than about 10 microns, less than about 7.5 microns, or less than about 5 microns. In other embodiments, a suitable emulsifier can achieve a suitable emulsion droplet size of less than about 7 microns, less than about 6 microns, less than about 5 microns, less than about 4 microns, or less than about 3 microns. In other embodiments, the emulsion droplet size is in the range of 0.01 microns to about 100 microns, or any increment thereof. An emulsion having a droplet size below a suitable threshold enhances the efficacy of an essential oil composition.

A suitable emulsifier is larch arabinogalactan. Arabinogalactan generally comprises arabinose and galactose monosaccharides, and can be synthetic or natural. Natural arabinogalactan can be derived from plants or microbes. For example, arabinogalactan can be derived from larch trees, and many fruits, vegetables, and beans. In some embodiments, arabinogalactan is a preferred emulsifier because it is capable of achieving a desired droplet size and also acts as an antioxidant against many ROS, including peroxyl radicals, hydroxyl radicals, peroxynitrite, superoxide anions, and singlet oxygen. Accordingly, the hydrophilic characteristics of arabinogalactan enhance the cellular coverage of an essential oil composition. A particular type of arabinogalactan is larch arabinogalactan. Other suitable emulsifiers include polydextrose, chitin, *Psyllium*, methyl-cellulose, hydrolyzed guar, guar, soy polysaccharide, oat bran, pectin, inulin, Fructooligosaccharides (FOS), xanthan gum, alginate, chemically modified cellulosic, Acacia, and gum Arabic.

In some embodiments, a suitable emulsifier can include a tannin compound, such as tannic acid. Tannin can be used as an alternative to or in combination with the emulsifiers described above. In some embodiments, a liquid emulsifier can comprise about 100% tannic acid, about 80% to about 95% tannic acid, about 60% to about 85% tannic acid, about 40% to about 60% or about 1% to about 50% tannic acid, with the balance being a liquid carrier.

The one or more essential oils can be selected for their anti-microbial, anti-oxidant, anti-fungal, anti-viral, and anti-coccidial properties. The one or more essential oils can be selected based on mode of action, which can include one or more of dissipate potassium gradient; permeabilize membrane; damage cell envelope; permeabilize membrane, cytoplasmic leakage, inhibit respiration; perturb membrane permeability, release cellular content; cell lysis and damage cell surface; inhibit respiration and extracellular production; compromise cytoplasmic membrane; cell membrane protein and enzyme function; damage cell wall; membrane-rigidifying effects, and affect lipid polymorphism. For example, in an embodiment, the one or more essential oils can destroy oocysts. In an embodiment, the oocysts can be selected from the genus *Eimeria*, *Isospora*, and Cryptosporidia.

Fibers

The feed composition can also include a fiber, for example, a fiber that can act as a food source for beneficial bacteria in the animal gut or intestinal tract of any subject. Fiber can also act as an adherent. Soluble fibers are preferred as they generally enhance product efficacy and stability by keeping less soluble materials in solution or suspension due to their inherent charge and ability to disperse other charged components in solution. Fiber content within the composition is adjustable to better maintain less soluble materials in solution or suspension, and to modify composition "stickiness".

The fibers can be selected from larch arabinogalactan, arabinogalactan, polydextrose, chitin, *Psyllium*, methylcellulose, hydrolyzed guar, guar, soy polysaccharide, oat bran, pectin, inulin, fructooligosaccharides (FOS), gum arabic, and combinations thereof. Other suitable fibers include a *Yucca* plant extract, commercially available as Saponix 5000 or BioLiquid 5000. Another example of a suitable fiber is *Yucca* plant extract, such as extracts from *Yucca schidigera*. These dietary fibers can offer various advantageous attributes including, but not limited to, one or more of being a natural fiber source, an Association of Official Analytical Chemists (AOAC) test fiber method, being a soluble or highly soluble fiber (e.g., water-soluble), having a low sensory impact, exhibiting pH and/or temperature stability, having hypoallergenicity, not requiring label warnings, having low or no flatulation, functioning as a bulking agent, slowing transit time, lowering stool pH, lowering cholesterol, increasing the ratio of HDL:LDL, pre-adapting GI tracts, being fermented completely and/or slowly, producing short-chain fatty acids, generating butyric acid, reducing glycermic index, reducing insulin response, promoting Bifidobacteria, promoting *Lactobacillus*, promoting growth factors, creating ideal growth, activating lymphocytes, activating macrophage, stimulating interferon, stimulating interleukin, and activating natural killer (NK) cells. These attributes can serve as a basis for selecting dietary fibers.

In some embodiments, the dietary fiber includes larch arabinogalactan. The larch arabinogalactan can generally include any composition comprising arabinogalactan and optionally other species, such as polyphenols. The larch arabinogalactan can be extracted or derived from any species in the genus *Larix*. For example, species of the genus *Larix* include, but are not limited to, *Larix laricina, Larix lyallii, Larix leptolepis, Larix occidentalis, Larix decidua, Larix dahurica, Larix sibirica, Larix gmelinii, Larix kaempferi, Larix czekanowskii, Larix potaninii, Larix mastersiana, Larix griffithii*, and hybrids thereof. The larch arabinogalactan is available from commercial sources. It can be provided in solid form, such as in the form of a powder, or it can be provided in liquid form.

The arabinogalactan can be characterized as a water-soluble, highly or densely branched polysaccharide. The arabinogalactan can generally include any compound composed of galactose units and arabinose units in an approximate ratio of about 100:1 to about 1:1. For example, the arabinogalactan can have a galactan backbone with side chains containing galactose units and arabinose units, wherein a ratio of the galactose units to arabinose units is about 6:1 or about 7.5:1. In an embodiment, the arabinogalactan can be characterized as having a backbone of (1→3)-linked β-D-galactopyranosyl units, each of which can bear a substituent at the C6 position. Most of these side chains can be galactobiosyl units containing a (1→6)-β-D-linkage and α-L-arabinofuranosyl units. These shall not be limiting, as the arabinogalactan can also include arabinogalactan derivatives, such as lipidated and/or quaternized forms of arabinogalactan.

The arabinogalactan can vary in molecular weight from low molecular weight polymers to large macromolecules. The molecular weight of the arabinogalactan can range from about 1,000 Daltons to about 2,500,000 Daltons, or any increment thereof. For example, the molecular weight of the arabinogalactan can range from about 6,000 Daltons to about 2,500,000 Daltons, about 6,000 Daltons to about 300,000 Daltons, about 3,000 Dalton to about 120,000 Dalton, about 15,000 Dalton to about 60,000 Dalton, or about 40,000 Dalton to about 60,000 Dalton, among other ranges.

The larch arabinogalactan can include other species. For example, typically, the larch arabinogalactan comprises polyphenols. The polyphenols can include any compound having two or more phenol groups or moieties. Examples of polyphenols include, but are not limited to, one or more of flavonoids, aromadendrines, anthocyanins, catecholins, catechins, and taxifolins. In an embodiment, the polyphenols include at least flavonoids, such as quercetin. The larch arabinogalactan typically comprises about 1 wt % to about 4 wt % of polyphenols; however, higher and lower concentrations are possible and within the scope of the present disclosure.

The larch arabinogalactan can be selected to, among other things, inhibit the growth of pathogens (e.g., pathogen growth can be inhibited in the presence of polyphenols); increase the production of short chain fatty acids (e.g., butyrate, propionate, acetate, etc.); preferentially promote the growth of beneficial bacteria (e.g., Bifidobacteria, *Lactobacillus*, etc.) and by that reduce the presence of harmful pathogens; inhibit pathogen attachment to the epithelial wall; decrease clostridia; boost or increase immunoglobulin production (e.g., IgA and/or SIga) to initiate inflammatory reactions, trigger respiratory burst activity by polymorphonuclear leukocytes, as well as result in cell mediated cytotoxicity, degranulation of eosinophils/basophils, phagocytosis by monocytes, macrophages, neutrophils, and eosinophils; stimulate B plasma cells; activate NK cells; minimize damage to the gastrointestinal tract (e.g., intestinal mucosal barrier); stimulate healthy macrophage increase; enhance NK cell cytotoxicity against K562 tumor cells through IFN gamma production; increase TNF alpha IL-1 and -6; increase circulating white blood cell counts; increase circulating neutrophils; increase circulating monocytes; improve gut health; reduce fecal ammonia and dry digestive matter; reduce diarrhea index; modulate glucose and insulin levels; promote lean build and weight gain; provide a natural source of antioxidants (e.g., quercetin); reduce illness risk; reduce incidence of scours; and/or lower toxicity, odor, and soften fecal matter.

Yeast Extract

The yeast extract may include yeast cells without cell walls or substantially without cell walls. Yeast extracts without cell walls or substantially without cell walls may be water soluble or substantially water soluble. In many embodiments, yeast extract includes one or more of the components of a yeast cell, without a cell wall or substantially without a cell wall. The yeast extract may be derived from one or more yeast cells. For example, the yeast extract may be derived from a plurality of yeast cells of one or more genera or species of yeast. Examples of yeast cells include, but are not limited to, those belonging to the genera: *Metschnikowia, Aureobasidiuim, Cryptococcus, Candida, Hanseniaspora, Pichia, Sporobolomyces, Sporidiobolus, Bulgaria, Cystofilobasidium, Malassezia, Saccharomyces, Rhodotorula, Mrakia, Glaciozyma, Starmerella, Wickerhamomyces, Tilletiopsis, Galactomyces, Issatchenkia, Kluyveromyces, Bensingtonia, Derxomyces, Hannaella, Dioszegia, Debaryomyces, Torulaspora, Trichosporon, Arthroderma, Hortaea, Rhodosporidium, Dipodascopsis, Kazachstania*, and *Kockovaella*. Examples of species of yeast cells include, but are not limited to, one or more of *Saccharomyces cerevisiae, Saccharomyces chevaiieri, Saccharomyces delbrueckii, Saccharomyces exiguus, Saccharomyces fermentati, Saccharomyces logos, Saccharomyces mellis, Saccharomyces microellipsoides, Saccharomyces oviformis, Saccharomyces rosei, Saccharomyces rouxii, Saccharomyces sake, Saccharomyces uvarum* Beij'er, *Saccharomyces willianus, Saccharomyces* sp., *Saccharomyces ludwigii, Saccharomyces sinenses, Saccharomyces baiii, Saccharomyces carlsbergensis, Schizosaccharomyces octosporus, Schizosaccharomyces pombe, Sporobolomyces roseus, Sporobolomyces salmonicolor, Torulopsis Candida, Torulopsis famta, Torulopsis globosa, Torulopsis inconspicua, Trichosporon behrendoo, Trichosporon capitatum, Trichosporon cutaneum, Wickerhamia fluoresens, Ashbya gossypii, Blastomyces dermatitidis, Candida albicans, Candida arborea, Candida guillermondii, Candida Krusei, Candida lambxca, Candida lipolytica, Candida par akrusei, Candida par apsilosis, Candida par apsilosis, Candida pseudotropicalis, Candida pulcherrima, Candida robusta, Candida rugousa, Candida utilis, Citeromyces matritensis, Crebrothecium ashbyii, Cryptococcus laurentii, Cryptococcus neoformans, Debaryomyces hansenii, Debaryomyces kloeckeri, Endomycopsis fibuligera, Eremothecium ashbyii, Geotrichum candidum, Geotrichum ludwigii, Geotrichum*

*robustum, Geotrichum suaveolens, Hansenula anomala, Hansenula arabitolgens, Hansenula jadinii, Hansenula saturnus, Hansenula schneggii, Hansenula subpelliculosa, Kloeckera apiculata, Lipomyces starkeyi, Pichia far inosa, Pichia membranaefaciens, Rhodosporidium toruloides, Rhodotorula aurantiaca, Rhodotorula glutinis, Rhodotorula minuta, Rhodotorula rubar*, and *Rhodotorula sinesis*. The yeast extract may be derived from any of the above-mentioned yeast cells and any other yeast cells known in the art, wherein a cell wall of the yeast cells is removed or substantially removed sufficient to form the yeast extract.

The yeast extract may include or be combined with one or more vitamins and one or more cofactors. A cofactor may include a metal ion cofactor, a coenzyme, and/or a coenzyme precursor. In an embodiment, the yeast extract may include a mixture of one or more of amino acids, peptides, water-soluble vitamins, and carbohydrates. For example, in some embodiments, the yeast extract may include compounds of one or more of thiamin, riboflavin, niacin, biotin, vitamin B6, folic acid, panthenol, pantothenic acid, inositol, cyanocobalamin, citric acid, pyridoxine, calcium, copper, iron, magnesium, manganese, phosphorous, potassium, sodium, and zinc. In embodiments in which the yeast extract includes or is combined with one or more vitamins and one or more cofactors, the yeast extract may be referred to as vitamin-enriched yeast extract. For example, in an embodiment, the yeast extract is a vitamin-enriched yeast extract.

The listed vitamins and cofactors can be provided in the composition in any form including vitamin derivatives and provitamin forms. Optionally, one or more alcohols can be utilized in the composition to enhance the activity and aid in the preservation of one or more vitamins. In an embodiment, an alcohol that may be utilized is benzyl alcohol.

The thiamine compounds may include one or more of thiamine hydrochloride, thiamine pyrophosphate, thiamine monophosphate, thiamine disulfide, thiamine mononitrate, thiamine phosphoric acid ester chloride, thiamine phosphoric acid ester phosphate salt, thiamine 1,5 salt, thiamine triphosphoric acid ester, and thiamine triphosphoric acid salt.

The riboflavin compounds may include one or more of riboflavin, riboflavin acetyl phosphate, flavin adenine dinucleotide, flavin adenine mononucleotide, and riboflavin phosphate.

The niacin compounds may include one or more of niacinamide, nicotinic acid, nicotinic acid adenine dinucleotide, nicotinic acid amide, nicotinic acid benzyl ester, nicotinic acid monoethanolamine salt, nicotinic acid hydrazide, nicotinic acid hydroxyamate, nicotinic acid-N-(hydroxymethyl) amide, nicotinic acid methyl ester, nicotinic acid mononucleotide, and nicotinic acid nitrite.

The pyridoxine compounds may include one or more of pyridoxine hydrochloride, and pyridoxal phosphate. Suitable forms of folic acid compounds may include one or more of folic acid and folinic acid.

The biotin compounds may include one or more of biotin, biotin sulfoxide, yeast, yeast extract, biotin 4-amidobenzoic acid, biotin amidocaproate N-hydroxysuccinimide ester, biotinyl 6-aminoquinoline, biotin hydrazide, biotin methyl ester, d-biotin-N-hydroxysuccinimide ester, biotin-maleimide, d-biotin p-nitrophenyl ester, biotin propranolol, 5-(N-biotinyl)-3-aminoallyl)-uridine 5'-triphosphate, biotinylated urdidine 5'-triphosphate, and N-e-biotinyl-lysine.

The panthothenic acid compounds may include one or more of coenzyme A.

In an embodiment, the yeast extract can include one or more of sulfur, phosphorus, potassium, magnesium, calcium sodium, iron, manganese, copper, zinc, aspartic acid, threonine, serine, glutamic acid, proline, glycine, alanine, cysteine, valine, methionine, isoleucine, leucine, tyrosine, phenylalanine, lysine, histidine, arginine, tryptophan, nitrogen, and organic carbon.

A yeast extract content of the feed composition may range from about 0.1 wt. % to about 10.0 wt. %. In embodiments in which the feed composition is used as a seed treatment, the yeast extract content of the feed composition may range from about 0.5 wt. % to about 5.0 wt. %. In a preferred embodiment, the yeast extract content is about 2.0 wt. %. In some embodiments, the yeast extract content of the treatment composition may range from about 1.0 wt. % to about 50 wt. %. In a preferred embodiment, the yeast extract content is about 20 wt. %.

The feed compositions may further comprise chitosan. For example, in an embodiment, the feed composition comprises yeast extract and chitosan. In some of these embodiments, the feed compositions may further comprise one or more of mineral chelated compounds, mineral salt compounds, a carrier, a solid carrier, a fiber, an enzyme, a pesticide, an insecticide, a fungicide, and a herbicide, as described elsewhere herein.

Carriers

The feed compositions can be prepared using carriers. Carriers are ideally inert materials which do not react with the active components of the composition chemically, or bind the active components physically by absorption or adsorption. Liquid carriers include pure water, such as reverse osmosis water, or other liquids such as crop oils or surfactants which are compatible with the composition and plant tissue. The composition can be at least about 50% liquid by weight, at least about 75% liquid by weight, at least about 85% liquid by weight, or at least about 90% liquid. In some embodiments, the composition will be about 80% to about 99% liquid, about 85% to about 98% liquid, about 90% to about 95% liquid, or about 91% to about 94% liquid. In other embodiments, the composition can be about 60% liquid to about 74% liquid, about 63% liquid to about 71% liquid, about 66% liquid to about 68% liquid, or about 67% liquid.

The total amount of carrier in a composition can be determined based on a ratio of one or more carriers to one or more elements within the composition. In some examples, a particular ratio or ratio range of one or more carriers to elements within the composition can be determined based on nutrition, growth, health, and/or other factors. In some other examples, a particular ratio or ratio range of one or more carriers to elements within the composition can be determined based on technical limitations of feed and/or feed-related processing machinery.

In some other compositions it is preferable to use solid carriers such as diatomaceous earth, alfalfa meal, finely ground limestone ($CaCO_3$), or magnesium carbonate ($MgCO_3$). Sugars such as sucrose, maltose, maltodextrin, or dextrose may also be used as solid carriers. In other compositions it is beneficial to use a combination of solid and liquid carriers. Carriers can further include gases or vapors, such as steam, air, or inert gases such as diatomic nitrogen, which can be used to fluidize a solid composition. Other similar or different carriers may be suitable for the techniques described herein, as would be recognized by one of skill in the art after review of this disclosure.

Additional Components

The feed composition can further include one or more enzymes, including a blend of enzymes. The enzymes can serve to break down cellulosic material and other material.

Useful and beneficial enzymes include enzymes which break down starch, such as amylases, enzymes which break down protein, such as proteases, enzymes which break down fats and lipids, such as lipases, and enzymes which break down cellulosic material, such as cellulases. Enzymes can be provided within the compositions described herein, for example, to facilitate a degradation of cellulosic material.

In one embodiment, an enzyme blend can comprise one or more of a carbohydrase derived from *Aspergillus oryzae*, a protease enzyme derived from *Aspergillus oryzae*, a cellulase enzyme, derived from *Aspergillus niger*, a lipase enzyme derived from *Aspergillus niger*, a pectinase enzyme derived from *Aspergillus niger*, and combinations thereof. A particular enzyme blend, known as Enzyme W, comprises carbohydrase derived from *Aspergillus oryzae*, protease enzyme derived from *Aspergillus oryzae*, celfulase enzyme derived from *Aspergillus niger*, lipase enzyme derived from *Aspergillus niger*, pectinase enzyme derived from *Aspergillus niger*. Enzyme W can optionally comprise rice.

Enzyme blends can be used in combination with an MCMS composition, in combination with a mineral chelated composition, in combination with a mineral sulfate composition, or as alone as a single-component feed composition. An example of a suitable enzyme blend is Enzyme W. In other embodiments, Enzyme W can be combined with a water soluble carrier. In some such embodiments, the water soluble carrier can partially or wholly replace the rice carrier. A list of non-limiting examples of water soluble carriers include sugars such as dextrose, sucrose, and the like, among many others. More generally, suitable enzyme blends can comprise one or more of a carbohydrase, a protease, a cellulase, a lipase, a pectinase enzyme, and optionally a carrier.

The composition can further include one or more chemical wetting agents, such as a non-ionic wetting agent. Wetting agents are typically comprised of surfactants, Wetting agents can promote water penetration in a subject. An example of a commercial wetting agent is X-Celerate, sold by Royal Oil Co. from Fort Worth, TX. Another example of a suitable surfactant is a *Yucca* plant extract. *Yucca* extract is commercially available as Saponix 5000 or BioLiquid 5000.

In one embodiment, the composition is prepared to provide aqueous soluble minerals. Additional optional components include forms of soluble calcium, boric acid, and the like.

Methods of Making Mineral Chelated Compounds

Referring to FIG. 1 a block flow diagram 100 of a method of making a rapidly soluble mineral chelated product is shown, according to some embodiments. A carboxylic acid 102, such as lactic acid, may be contacted 106 with an inorganic mineral compound 104, sufficient to form a solution 108. The solution 108 may be reacted 110 over a period of time, sufficient to provide a mineral chelated compound 112. The mineral chelated compound 112 may then be transferred and reduced in size 114 to sufficient to provide a rapidly soluble mineral chelated product 116. Transferring may include transferring to one or more molds, prior to the compound substantially solidifying.

Carboxylic acid may be contacted with an inorganic mineral compound, such as by mixing. Molar amounts or stoichiometric amounts may be used. If the carboxylic acid is lactic acid, the carboxylic acid content may be about 60% to about 80% of the mixture by weight. The inorganic mineral compound may include about 20% to about 40% of the mixture by weight. More specifically, the lactic acid may include about 62% to about 76% and the inorganic mineral compound may include about 24% to about 38% by weight of the mixture. The lactic acid may be 88% strength lactic acid, for example.

When the carboxylic acid is propionic acid, the carboxylic acid content may be about 55% to about 75% by weight and the inorganic mineral compound content about 25% to about 45% by weight. More specifically, the propionic acid may include about 57% to about 72% and the inorganic mineral compound may include about 28% to about 43% by weight. When the carboxylic acid is butyric acid, the carboxylic acid content may be about 60% to about 80% by weight and the inorganic mineral compound content about 20% to about 40% by weight. More specifically, the butyric acid may include about 61% to about 76% and the inorganic mineral compound may include about 24% to about 39% by weight.

The carboxylic acid and inorganic mineral compound may be placed in a vessel, optionally with one or more catalysts. Examples of a catalyst include iron and alkaline earth metals. The vessel may be optionally agitated, such as by vibrating, shaking, turning or spinning. Water may be added to the vessel, before, during or after the contacting of carboxylic acid and inorganic mineral compound. Once a solution is formed, it may be reacted over a period of time. The reaction may initiate based solely on the contact between carboxylic acid and inorganic mineral compound, after addition or contact with a catalyst or similarly with the contact or addition of water of some combination thereof. Depending on the type of inorganic mineral compound utilized, carbon dioxide may be evolved as the solution heats up. Both water vapor and optionally carbon dioxide may be generated and released from the vessel. No reflux process is needed or desired, as often used conventionally with regard to related reactions. By-products may be passively and naturally removed, without the need for solvent removal or refluxing. Carbon dioxide and water may be released into the atmosphere, for example.

The reaction ultimately produces a mineral chelated compound. The mineral chelated compound may form a porous, brittle rock if left to solidify. The mineral chelated compound may then be transferred from the vessel to one or more molds, prior to the compound substantially solidifying. The molds may be of varying shapes or sizes, such that the compound may be easily handled and transported. Water vapor may be further driven off the compound as it solidifies within the one or more molds.

The mineral chelated compound may be reduced in size. Reducing the compound to a fine powder may increase its solubility, providing a rapidly soluble mineral chelated product. After contacting with a mill, the particles may be screened to further separate larger particles from smaller ones. Any larger particles may be placed back in the mill for further reduction in size. Screening may include filtering with a mesh. The mesh size may be about 50 to about 70 or about 50, about 60 or about 70 size mesh. The mesh size may less than 50 for example.

The rapidly soluble mineral chelated product may be further contacted with a carrier. The carrier may be a dry substrate or a liquid carrier, for example. The carrier may include one or more of diatomaceous earth, calcium carbonate, limestone, sugars, dextrose, water, ground corn cobs, starch and combinations thereof.

One example of the rapidly soluble mineral chelated product is organically chelated cobalt, for example, having the chemical formula: $(CH_3—CH(OH)COO^-)_2—Co$ which can be shown as:

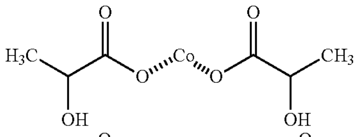

or

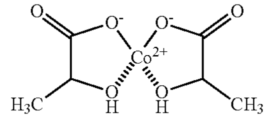

The metal chelated compound may include one or more of a cobalt lactate compound, zinc lactate compound, copper lactate compound, or manganese lactate compound. The carrier may include diatomaceous earth.

The mineral product discussed in various embodiments may include one or more mineral chelated lactates in addition to other components. The mineral product may include one or more metal sulfates, such as sulfates of manganese, zinc, copper or combinations thereof. The one or more mineral chelated lactates may be a cobalt lactate compound, zinc lactate compound, copper lactate compound or manganese lactate compound. A carrier may be utilized, such as dextrose. Additional components may include fibers, one or more enzymes, or combinations thereof.

The one or more mineral chelated lactates may be present in an amount of about 15% to about 20% of the product by weight. The one or more metal sulfates may be present in an amount of about 2% to about 10% of the product by weight. The fiber may be present in an amount of about 1% to about 5% of the product by weight. The enzymes may include about 0.1% to about 2% by weight, the *Yucca* about 1% to about 5% by weight, and the carrier about 60% to about 80% by weight.

Method of Making Essential Oil Compositions

Figure 2:
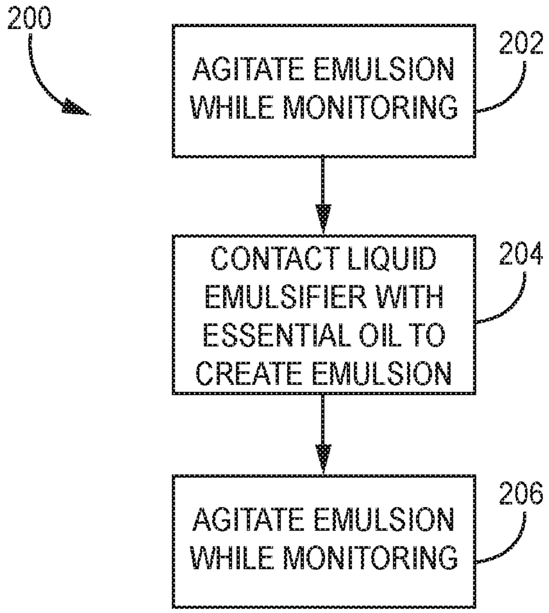
FIG. 2 is a flowchart of a method of making an essential oil composition, according to one or more embodiments of the present disclosure.

FIG. 2, illustrates a block flow diagram of a method 200 of making an essential oil composition, such as an essential oil emulsification in an aqueous carrier, is shown, according to some embodiments. One or more liquid emulsifiers are agitated 202. The one or more liquid emulsifiers are contacted 204 with one or more essential oils, sufficient to create an emulsion. The emulsion is agitated 206 while monitoring at least an emulsion temperature.

The liquid emulsifier (i.e., water and one or more emulsifiers) is agitated 202 in a vessel, such as by stirring, for a time sufficient to produce visible motion on the surface of the one or more liquid emulsifiers. The visible motion can be from the approximate surface center to one or more surface edges, at the perimeter of the vessel, for example. The time taken to reach such visible motion depends on the type of liquid emulsifier and ratio of emulsifier to water (e.g., viscosity). Once a suitable motion is established at the surface of the liquid emulsifier, one or more essential oils are added (e.g., contacted 204). The agitation of the liquid continues and an emulsion begins to form on contact. The contact rate or addition rate should be slow enough to substantially prevent volatilization of the essential oils.

The agitation continues during the addition of the essential oils. The emulsion begins to form assuming the rate of essential oil addition is slow enough to prevent a high shear environment, adversely affecting the volatilization of the oils. Agitation 206 of the emulsion then continues until the emulsion temperature reaches about 100° F. to about 110° F., about 103° F. to about 108° F. or about 104° F. to about 107° F. As the emulsion forms, the viscosity increases. The method of agitation should be adjusted to compensate for the increase in viscosity. For example, if a stirring method is used, the stirrer or paddle should increase in force to maintain the same level of movement of the liquid as the emulsion thickens.

The final emulsion can have an average droplet size of less than about 25 microns, less than about 15 microns, less than about 10 microns or less than about 5 microns. The smaller droplet size allows for a more stable emulsion and one that previously could not be utilized for animal health or agricultural uses due to instability and high volatilization rates.

Figure 3:
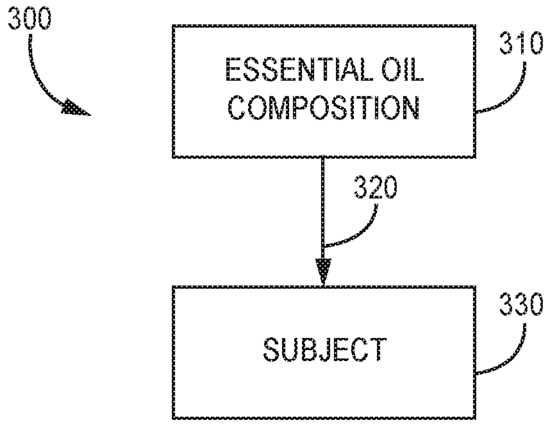
FIG. 3 is a flowchart of a method of treating a subject to improve the health and/or feed efficiency of the subject, according to one or more embodiments of the present disclosure.

FIG. 3 illustrates a method 300 of treating a subject 330 to improve the health and/or feed efficiency of the subject, wherein the method comprises administering 320 an essential oil composition 310 to a subject. Administering 320 can include oral ingestion of the essential oil composition 310 as a feed or liquid, ingesting the essential oil composition in an encapsulated form, or applying the essential oil composition 310 topically. Pill-based or encapsulated administrations can be ideal for compositions which are not sufficiently palatable or an animal. However, administration via water or food-based carriers can be preferred for ease of administration.

The one or more living organisms may include mammals, such as monogastric or ruminant mammals. Administering 320 may include providing the product as a feed or feed supplement. Alternatively, administering 320 may include providing the product to the mammals through ingestion of a plant containing the product. Administering 320 may increase rumen activity in a mammal, for example. Increasing rumen activity may include increasing metabolism.

A subject 330 can include all manner of animals, including poultry, horses, cows, pigs, and the like. Additionally or alternatively, subject 330 can include humans. Additionally or alternatively, subject 330 can include fish, shrimp, crustaceans, and other aquaculture. Additionally or alternatively, subject 330 can include oviparous and ovuliparous animals.

The amount of essential oil composition administered to a subject 330 can depend on the species of the subject 330, the size of the subject 330, and the health status of a subject 330. For example, essential oil compositions can be administered regularly (i.e., daily) as a routine nutritional and health supplement, as an intervention (i.e., for several days or for the duration of a particular episode) in response to or in conjunction with increased stress, disease, birth, or other factors, or as a one-time administration during birth or a severe infection, disease, or injury. In some embodiments, essential oil compositions 310 can be administered 320 to a subject 330 as a routine feed, in a dose of about 0.1 mg of essential oil fraction to about 10 mg of essential oil fraction per kg of subject body weight (mg/kg), about 0.25 mg/kg to about 1.1 mg/kg, about 0.5 mg/kg to about 0.75 mg/kg, or about 0.5 mg/kg. Routine feed can include water, liquid feed, and solid feeds. Essential oil compositions 310 are generally administered in an amount above 5 ppm essential oil relative to the total feed dose, or approximately about 0.01 mg/kg. The dosage amount of essential oil can be varied based on the health of a subject 330. For example, an amount of essential oil per does can be increased in response to a subject 330 showing a deterioration in health, or other physical characteristic.

In some embodiments, essential oil compositions 310 can be administered 320 to a subject 330 as an intervention in a dose of about 1.0 mg/kg to about 10 mg/kg, about 2 mg/kg to about 7 mg/kg, or about 3.5 mg/kg. In some embodiments, essential oil compositions 310 can be administered 320 to a subject 330 as a one-time administration in a dose of about 10 mg/kg to about 30 mg/kg, about 13 mg/kg of essential oil fraction to about 24 mg/kg, or about 17 mg/kg.

Methods of Administering the Feed Composition

Figure 4:
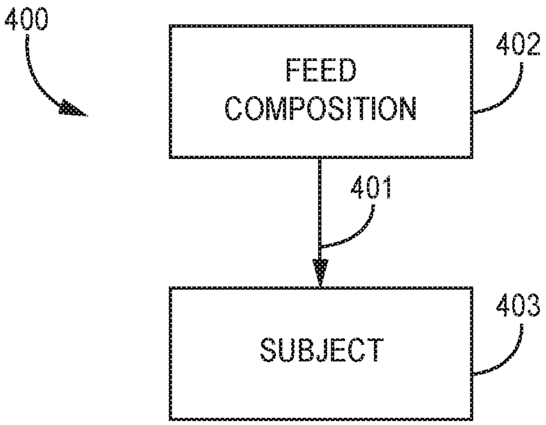
FIG. 4 is a flowchart of a method of administering a feed composition, according to one or more embodiments of the present disclosure.

FIG. 4 is a flowchart of a method of administering a feed composition, according to one or more embodiments of the present disclosure. As shown in FIG. 4, the method 400 comprises administering 401 a feed composition 402 to a subject 403. The feed composition can include any of the feed compositions of the present disclosure. The administering 401 is not particularly limited and can include any method suitable for delivering the composition to the subject. The composition can be administered to the subject in solid or liquid form. For example, the composition can be administered as nutritional or feed supplements. In an embodiment, the administering includes mixing the composition with water and/or feed. In an embodiment, the administering includes administering by gavage. In an embodiment, the administering includes bolus feeding. In addition or in the alternative, the administering 401 can include oral ingestion of the composition as a feed or liquid, ingesting the composition in an encapsulated form, or applying the composition topically. Pill-based or encapsulated administrations can be ideal for compositions which are not sufficiently palatable or an animal. However, administration via water or food-based carriers can be preferred for ease of administration. These are provided as examples and thus shall not be limiting. Other methods of administering known in the art can be used herein without departing from the scope of the present disclosure.

The subject can include all manner of animals, including poultry, horses, cows, pigs, and the like. Additionally or alternatively, subject can include humans. Additionally or alternatively, subject can include fish, shrimp, crustaceans, and other aquaculture. Additionally or alternatively, subject can include oviparous and ovuliparous animals.

In some embodiments, the feed composition may be provided in the form of a liquid. For example, in some embodiments, a liquid feed composition is provided. In some embodiments, the liquid feed composition includes one or more of the following: one or more mineral compounds, wherein the mineral compounds include at least one or cobalt lactate and cobalt acetate; an essential oil composition comprising at least one of cinnamon essential oil, thyme essential oil, and oregano essential oil; and one or more emulsifiers, wherein the one or more essential oils are present as an emulsion and an average particle size of the one or more essential oils in the emulsion is about 25 microns or less (or any incremental value or subrange between 0 microns and 25 microns).

In some embodiments, the cobalt lactate and/or cobalt acetate has a purity of about 90% or greater. In some embodiments, the emulsifiers are selected from larch arabinogalactan, propylene glycol alginate, xanthan gum, or a combination thereof. In some embodiments, the feed composition further comprises a carrier. In some embodiments, the carrier is R.O. water. In some embodiments, the feed composition includes up to about 4% by weight of cobalt lactate and/or cobalt acetate. In some embodiments, the feed composition includes up to about 7% by weight of essential oil composition. In some embodiments, the feed composition includes about 3% by weight of cobalt lactate, about 6% by weight of essential oil composition, and about 90% by weight of carrier, and further comprising about 1% by weight of emulsifier. In some embodiments, the mineral compound further includes one or more of lithium, sodium, magnesium, aluminum, potassium, calcium, scandium, titanium, vanadium, chromium, manganese, iron, cobalt, nickel, copper, zinc, selenium, rubidium, strontium, zirconium, molybdenum, silver, tin, iodine, gold, and chitosan. In some embodiments, the mineral compound further includes one or more of formate, acetate, oxalate, lactate, propionate, butyrate, fumarate, valerate, caproate, citrate, sorbate, benzoate, enanthate, caprylate, pelargonate, caprate, laurate, myristate, palmitate, margarate, stearate, icosanoate, EDTA, and ethylene diamine. In some embodiments, the essential oils further include one or more of lavender essential oil, bay leaf essential oil, cinnamon leaf essential oil, laurel leaf essential oil, lemon grass essential oil, spearmint essential oil, peppermint essential oil, rosemary essential oil, and clary sage essential oil. In some embodiments, the feed composition further comprises one or more fibers. In some embodiments, the fibers are selected from larch arabinogalactan, tannin compounds, polydextrose, chitin, *Psyllium*, methyl-cellulose, hydrolyzed guar, guar, soy polysaccharide, oat bran, pectin, inulin, Fructooligosaccharides (FOS), xanthan gum, alginate, sodium alginate, chemically modified cellulosic, Acacia, gum Arabic, or propylene glycol alginate. In some embodiments, further comprises one or more mineral salts. In some embodiments, the mineral salt includes one or more of lithium, sodium, magnesium, aluminum, potassium, calcium, scandium, titanium, vanadium, chromium, manganese, iron, cobalt, nickel, copper, zinc, selenium, rubidium, strontium, zirconium, molybdenum, silver, tin, iodine, gold, and chitosan. In some embodiments, the anion of the mineral salt is selected from sulfates, carbonates, gluconates, oxides, hydrates, hydroxides, or halides.

In some embodiments, a method of administering a feed composition includes administering a feed composition to a subject, wherein the feed composition comprises one or more of the following: one or more mineral compounds, wherein the mineral compounds include at least cobalt lactate; an essential oil composition comprising at least one of cinnamon essential oil, thyme essential oil, and oregano essential oil; and one or more emulsifiers, wherein the one or more essential oils are present as an emulsion and an average particle size of the one or more essential oils in the emulsion is about 25 microns or less. In some embodiments, the subject is an animal. In some embodiments, the emulsifiers are selected from larch arabinogalactan, propylene glycol alginate, xanthan gum, or a combination thereof. In some embodiments, the composition includes about 3% by weight of cobalt lactate and/or cobalt acetate, about 6% by weight of essential oil composition, and about 90% by weight of carrier, and further comprising about 1% by weight of emulsifier.

The following Examples are intended to illustrate the above invention and should not be construed as to narrow its scope. One skilled in the art will readily recognize that the Examiners suggest many other ways in which the invention could be practiced. It should be understood that numerous variations and modifications may be made while remaining within the scope of the invention.

Formulation 1

| Material | Percent | Pounds/Ton |
|---|---|---|
| RO Water | 51.90 | 1038.00 |
| AG Liquid | 20.62 | 412.40 |
| Sodium Chloride | 13.92 | 278.40 |
| Potassium Chloride | 7.73 | 154.60 |
| CTO Oil Blend Concentrate | 3.20 | 64.00 |
| Calcium Lactate | 1.61 | 32.20 |

-continued

| Formulation 1 | | |
|---|---|---|
| Material | Percent | Pounds/Ton |
| Tic Gum | 0.52 | 10.40 |
| Cobalt Lactate for Feed | 0.50 | 10.00 |

| Formulation 2 | | |
|---|---|---|
| 302 mg CL/hd/day<br>302 mg EO/hd/day<br>Material | Grams per Serving | Formulation (%) |
| RO Water | 9.034 | 90.34 |
| CTO Oil Blend Concentrate | 0.604 | 6.04 |
| Tic Gum | 0.060 | 0.60 |
| Cobalt Lactate for Feed | 0.302 | 3.02 |
| | 10.000 | 100.00 |

| Formulation 3 | | |
|---|---|---|
| 302 mg CL/hd/day<br>302 mg EO/hd/day<br>Material | Grams per Serving | Formulation (%) |
| RO Water | 39.034 | 97.59 |
| CTO Oil Blend Concentrate | 0.604 | 1.51 |
| Tic Gum | 0.060 | 0.15 |
| Cobalt Lactate for Feed | 0.302 | 0.76 |
| | 40.000 | 100.00 |

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A feed composition for ruminants comprising:

(a) cobalt lactate at a weight percent of the feed composition of about 0.1% to about 3%;

(b) one or more essential oils at a weight percent of the feed composition of about 01% to about 5%, the one or more essential oils selected from the group consisting of cinnamon, thyme, and oregano; and (c) one or more emulsifiers including larch arabinogalactan.

2. The feed composition of claim 1, further comprising one or more of lithium, sodium, magnesium, aluminum, potassium, calcium, scandium, titanium, vanadium, chromium, manganese, iron, nickel, copper, zinc, selenium, rubidium, strontium, zirconium, molybdenum, silver, tin, iodine, gold, and chitosan.

3. The feed composition of claim 2, further comprising one or more of formate, oxalate, propionate, butyrate, fumarate, valerate, caproate, citrate, sorbate, benzoate, enanthate, caprylate, pelargonate, caprate, laurate, myristate, palmitate, margarate, stearate, icosanoate, ethylenediaminetetraacetic acid (EDTA), and ethylene diamine.

4. The feed composition of claim 2, further comprising one or more of sulfates, carbonates, gluconates, oxides, hydrates, hydroxides, and halides.

5. The feed composition of claim 1, wherein the one or more essential oils further comprises one or more of lavender essential oil, bay leaf essential oil, cinnamon leaf essential oil, laurel leaf essential oil, lemon grass essential oil, spearmint essential oil, peppermint essential oil, rosemary essential oil, and clary sage essential oil.

6. The feed composition of claim 1, wherein the one or more emulsifiers further comprise propylene glycol alginate, xanthan gum, or a combination thereof.

7. The feed composition of claim 1, wherein the one or more essential oils are present as an emulsion with the one or more emulsifiers, and an average particle size of the one or more essential oils in the emulsion is about 25 microns or less.

8. The feed composition of claim 1, further comprising one or more fibers.

9. The feed composition of claim 8, wherein the one or more fibers are selected from larch arabinogalactan, tannin compounds, polydextrose, chitin, *Psyllium*, methyl-cellulose, hydrolyzed guar, guar, soy polysaccharide, oat bran, pectin, inulin, Fructooligosaccharides (FOS), xanthan gum, alginate, sodium alginate, chemically modified cellulosic, Acacia, gum Arabic, and propylene glycol alginate.

10. The feed composition of claim 1, further comprising one or more yeast extracts, and wherein the one or more yeast extracts include at least one yeast extract without a cell wall.

11. The feed composition of claim 10, wherein the one or more yeast extracts include at least one yeast extract that is derived from yeast cells selected from *Saccharomyces cerevisiae, Saccharomyces chevaiieri, Saccharomyces delbrueckii, Saccharomyces exiguus, Saccharomyces fermentati, Saccharomyces logos, Saccharomyces mellis, Saccharomyces microellipsoides, Saccharomyces oviformis, Saccharomyces rosei, Saccharomyces rouxii, Saccharomyces sake, Saccharomyces uvarum* Beij'er, *Saccharomyces willianus, Saccharomyces* sp., *Saccharomyces ludwigii, Saccharomyces sinenses, Saccharomyces bailii, Saccharomyces carlsbergensis, Schizosaccharomyces octosporus, Schizosaccharomyces pombe, Sporobolomyces roseus, Sporobolomyces salmonicolor, Torulopsis Candida, Torulopsis famta, Torulopsis globosa, Torulopsis inconspicua, Trichosporon behrendoo, Trichosporon capitatum, Trichosporon cutaneum, Wickerhamia fluoresens, Ashbya gossypii, Blastomyces dermatitidis, Candida albicans, Candida arborea, Candida guillermondii, Candida Krusei, Candida lambxca, Candida lipolytica, Candida par akrusei, Candida par apsilosis, Candida par apsilosis, Candida pseudotropicalis, Candida pulcherrima, Candida robusta, Candida rugousa, Candida utilis, Citeromyces matritensis, Crebrothecium ashbyii, Cryptococcus laurentii, Cryptococcus neoformans, Debaryomyces hansenii, Debaryomyces kloeckeri, Endomycopsis fibuligera, Eremothecium ashbyii, Geotrichum candidum, Geotrichum ludwigii, Geotrichum robustum, Geotrichum suaveolens, Hansenula anomala, Hansenula arabitolgens, Hansenula jadinii, Hansenula saturnus, Hansenula schneggii, Hansenula subpelliculosa, Kloeckera apiculata, Lipomyces starkeyi, Pichiafar inosa, Pichia membranaefaciens, Rhodosporidium toruloides, Rhodotorula aurantiaca, Rhodotorula glutinis, Rhodotorula minuta, Rhodotorula rubar*, and *Rhodotorula sinesis.*

12. The feed composition of claim 1, further comprising a carrier.

13. The feed composition of claim 12, wherein the carrier is reverse osmosis water.

14. The feed composition of claim 1, wherein the weight percent of cobalt lactate is between about 0.5% and about 2%.

15. The feed composition of claim 1, wherein the weight percent of the one or more essential oils is between about 0.1% and about 2%.

16. A method of administering a feed composition to ruminants, the method comprising:

administering a feed composition to a ruminant, wherein the feed composition comprises:

(a) cobalt lactate at a weight percent of the feed composition of about 0.1% to about 3%;

(b) one or more essential oils at a weight percent of the feed composition from about 0.1% to about 5%, the one or more essential oils selected from the group consisting of cinnamon, thyme, and oregano; and (c) one or more emulsifiers comprising larch arabinogalactan.

17. The method of claim 16, wherein the one or more essential oils are present as an emulsion with the one or more emulsifiers, and an average particle size of the one or more essential oils in the emulsion is about 25 microns or less.

18. The method of claim 16, wherein the one or more emulsifiers further comprise propylene glycol alginate, xanthan gum, or a combination thereof.

19. The method of claim 16, wherein the feed composition does not comprise cobalt carbonate.

20. The method of claim 16, wherein the feed composition is administered to the ruminant to provide cobalt in an amount of about 302 mg per ruminant per day.

* * * * *